(12) United States Patent
Boyle et al.

(10) Patent No.: US 10,158,793 B2
(45) Date of Patent: Dec. 18, 2018

(54) PROCESSING SURVEY DATA OF AN UNDERWATER SCENE

(71) Applicant: Cathx Research Ltd., Newhall, Naas, County Kildare (IE)

(72) Inventors: Adrian Boyle, Kildare (IE); Michael Flynn, Athy (IE)

(73) Assignee: Cathx Research Ltd., County Kildare (IE)

( * ) Notice: Subject to any disclaimer, the term of this patent is extended or adjusted under 35 U.S.C. 154(b) by 0 days.

(21) Appl. No.: 14/436,871

(22) PCT Filed: Oct. 17, 2013

(86) PCT No.: PCT/EP2013/071807
§ 371 (c)(1),
(2) Date: Apr. 17, 2015

(87) PCT Pub. No.: WO2014/063999
PCT Pub. Date: May 1, 2014

(65) Prior Publication Data
US 2015/0363914 A1     Dec. 17, 2015

(30) Foreign Application Priority Data

Oct. 17, 2012  (GB) .................................. 1218630.0
Oct. 17, 2012  (GB) .................................. 1218644.1
Oct. 17, 2012  (GB) .................................. 1218648.2

(51) Int. Cl.
*H04N 5/225*     (2006.01)
*G06T 3/40*      (2006.01)
(Continued)

(52) U.S. Cl.
CPC ............. *H04N 5/2251* (2013.01); *B60R 1/00* (2013.01); *G01C 3/08* (2013.01); *G01C 11/02* (2013.01);
(Continued)

(58) Field of Classification Search
None
See application file for complete search history.

(56) References Cited

U.S. PATENT DOCUMENTS 4,948,258 A    8/1990  Caimi
5,604,582 A    2/1997  Rhoads et al.
(Continued)

FOREIGN PATENT DOCUMENTS

WO    2004029878 A1    4/2004
WO    2005033629 A2    4/2005

OTHER PUBLICATIONS

Howland et al., "Advances in Large-Area Photomosaicking Underwater," IEEE Journal of Oceanic Engineering, Jul. 1, 2004. 29: pp. 872-886.
(Continued)

*Primary Examiner* — Ryan R Yang
(74) *Attorney, Agent, or Firm* — Womble Bond Dickinson (US) LLP; John J. Penny

(57) ABSTRACT

The present invention relates to a method of processing survey data of an underwater scene comprising acquiring an augmented image of each of a plurality of fields of view within the scene, wherein each augmented image comprises at least a scene image of the scene, a location tag associated with that scene image, and metadata associated with that scene image.

15 Claims, 25 Drawing Sheets

(51) Int. Cl.
*G06F 17/30* (2006.01)
*G01C 3/08* (2006.01)
*G01C 11/02* (2006.01)
*H04N 5/247* (2006.01)
*H04N 5/265* (2006.01)
*H04N 7/18* (2006.01)
*B60R 1/00* (2006.01)
*G06K 9/46* (2006.01)
*G06T 1/00* (2006.01)
*G06T 11/00* (2006.01)

(52) U.S. Cl.
CPC .. *G06F 17/30265* (2013.01); *G06F 17/30268* (2013.01); *G06K 9/46* (2013.01); *G06T 1/0007* (2013.01); *G06T 3/4038* (2013.01); *G06T 11/00* (2013.01); *H04N 5/2256* (2013.01); *H04N 5/247* (2013.01); *H04N 5/265* (2013.01); *H04N 7/18* (2013.01); *G06T 2200/32* (2013.01); *G06T 2207/10144* (2013.01); *G06T 2207/10152* (2013.01)

(56) References Cited

U.S. PATENT DOCUMENTS

| | | | |
|---|---|---|---|
| 5,673,082 A | 9/1997 | Wells et al. | |
| 6,377,700 B1 | 4/2002 | Mack et al. | |
| 7,102,637 B2 * | 9/2006 | Chen | H04N 13/0025 345/629 |
| 8,861,785 B2 * | 10/2014 | Oi | G06T 7/0042 345/473 |
| 2003/0058738 A1 | 3/2003 | Erikson | |
| 2003/0215127 A1 | 11/2003 | Stern et al. | |
| 2007/0131850 A1 | 6/2007 | Cofer et al. | |
| 2007/0237505 A1 | 10/2007 | Takita | |
| 2012/0169770 A1 * | 7/2012 | Snavely | G06F 17/30274 345/629 |
| 2013/0002715 A1 * | 1/2013 | Tidman | H04N 5/232 345/629 |
| 2013/0050260 A1 * | 2/2013 | Reitan | G06F 3/011 345/633 |
| 2014/0049537 A1 * | 2/2014 | Sahoo | G06T 19/006 345/419 |
| 2014/0293091 A1 | 10/2014 | Rhoads et al. | |
| 2016/0198069 A1 | 7/2016 | Boyle et al. | |
| 2016/0198074 A1 | 7/2016 | Boyle et al. | |

OTHER PUBLICATIONS

Rzhanov et al., "Underwater video mosaicing for seabed mapping," IEEE Image Processing International Conference, Sep. 10, 2000. pp. 224-227.
Singh et al., "Seabed AUV Offers New Platform for High-Resolution Imaging," EOS, Aug. 3, 2004. 85: pp. 289-296.
International Preliminary Report on Patentability for PCT/EP2013/071807 dated Apr. 21, 2015, 8 pp.
International Search Report and Written Opinion for PCT/EP2013/071807 dated Mar. 7, 2014, 4 pp.
Bonin et al., "Imaging Systems for Advanced Underwater Vehicles," Journal of Maritime Research, Mar. 19, 2011. 8(1): pp. 65-86.
Bruno et al., "Experimentation of structured light and stereo vision for underwater 30 reconstruction," ISPRS Journal of Photogrammetry and Remote Sensing, Feb. 23, 2011. vol. 66, No. 4, pp. 1-18.
Casals, A., et al., "Augmented Reality to Assist Teleoperation Working with Reduced Visual Conditions," Proceedings of the 2002 International Conference on Robotics & Automation, IEEE, Washington DC, May 2002. pp. 235-240.
Casals, A., "Assisted Teleoperation Through the Merging of Real and Virtual Images," Robotics Research, STAR 15, Dario, P., et al., eds., pp. 135-144, 2005, Springer-Verlag Berlin Heidelberg.
Eustice, R.M., Large-Area Visually Augmented Navigation for Autonomous Underwater Vehicles, Massachusetts Institute of Technology and Woods Hole Oceanographic Institution, Thesis, Jun. 2005, 187 pages.
International Search Report and Written Opinion for PCT/EP2013/071804 dated Jan. 20, 2014, 11 pages.
International Preliminary Report on Patentability for PCT/EP2013/071804 dated Apr. 21, 2015, 8 pages.
International Search Report and Written Opinion for PCT/EP2013/071806 dated Jan. 20, 2014, 9 pages.
International Preliminary Report on Patentability for PCT/EP2013/071806 dated Apr. 21, 2015, 7 pages.
Kocak et al., "Laster Projection Photogrammetry and Video System for Quantification and Mensuration," IEEE Conference on Oceans '02, Oct. 29, 2002. pp. 1569-1574.
Morales, R., et al., "An Underwater Augmented Reality System for Commercial Diving Options," OCEANS 2009, MTS/IEEE Biloxi—Marine Technology for Our Future: Global and Local Challenges, Oct. 26-29, 2009. 8 pages.
Nozeres, C., Managing Image Data in Aquatic Sciences: An Introduction to Best Practices and Workflows, Canadian Technical Report of Fisheries and Aquatic Sciences 2962, Fisheries and Oceans Canada, Maurice Lamontagne Institute, 2011, 185 pages.
Roman et al., "Application of structured light imaging for high resolution mapping of underwater archaeological sites," Oceans 2010 IEEE, May 24, 2010. pp. 1-9.
Schechner, Y.Y., et al., "Clear Underwater Vision," Proc. Computer Vision & Pattern Recognition, 2004. 1: pp. 536-543.
Sedlazeck et al., "3D Reconstruction Based on Underwater Video from ROV Kiel 6000 Considering Underwater Imaging Conditions," Ozean, 2009, 10 pages, <http://www.ozean-der-zukunft.de/>.
Tetlow, S., et al., "Three-dimensional measurement of underwater work sites using structured laser light," Meas. Sci. Technol, Sep. 1999. 10(12): pp. 1162-1167.
Zanoli, S.M., et al., "Underwater Imaging System to Support ROV Guidance," Oceans '98 Conference Proceedings, IEEE, Sep. 28-Oct. 1, 1998, Nice, France, pp. 56-60.
U.S. Appl. No. 14/436,868, filed Apr. 17, 2015, Improvements in Relation to Underwater Imaging for Underwater Surveys.
U.S. Appl. No. 14/436,869, filed Apr. 17, 2015, Improvements in and Relating to Gathering Range and Dimensional Information for Underwater Surveys.

\* cited by examiner

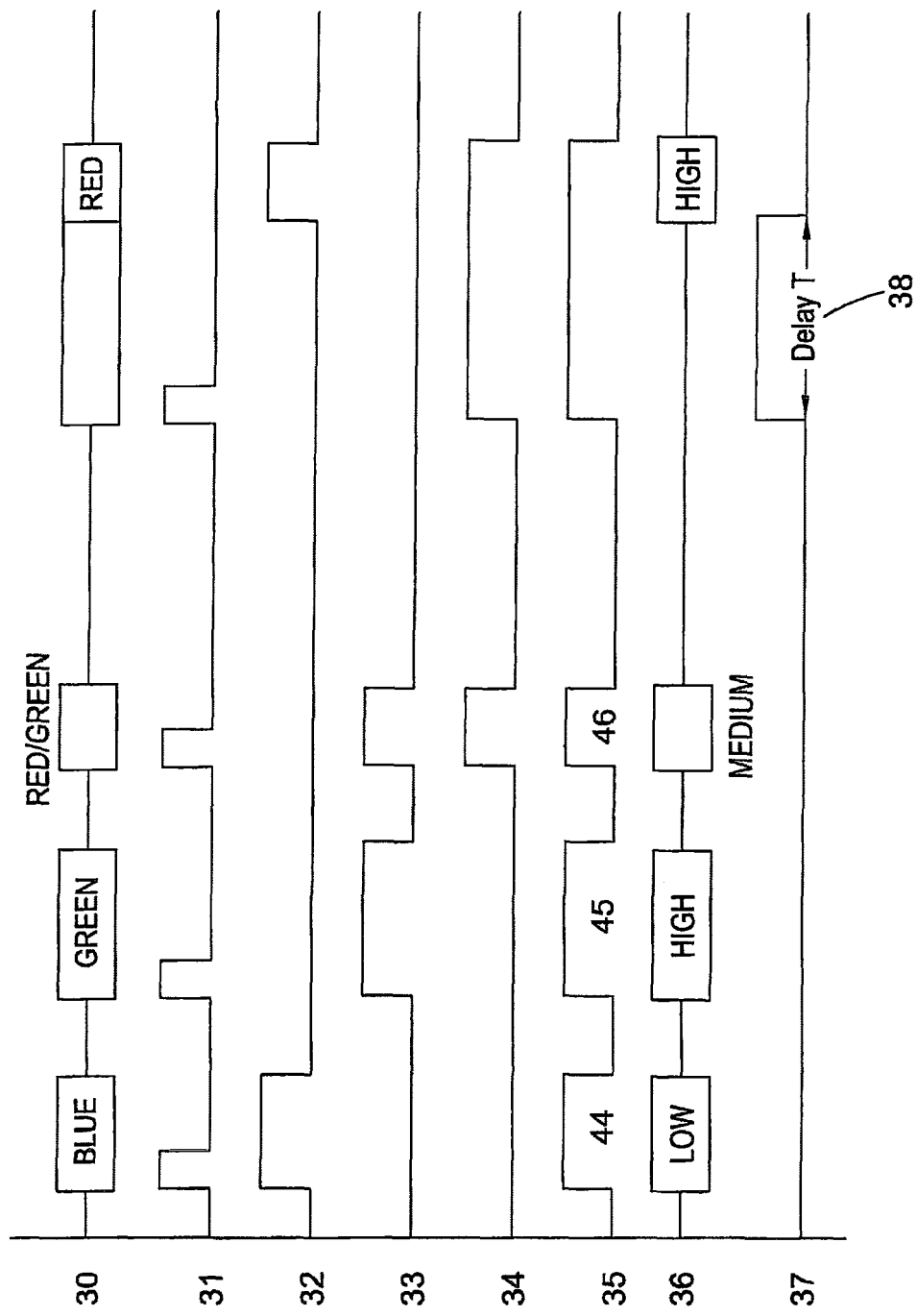

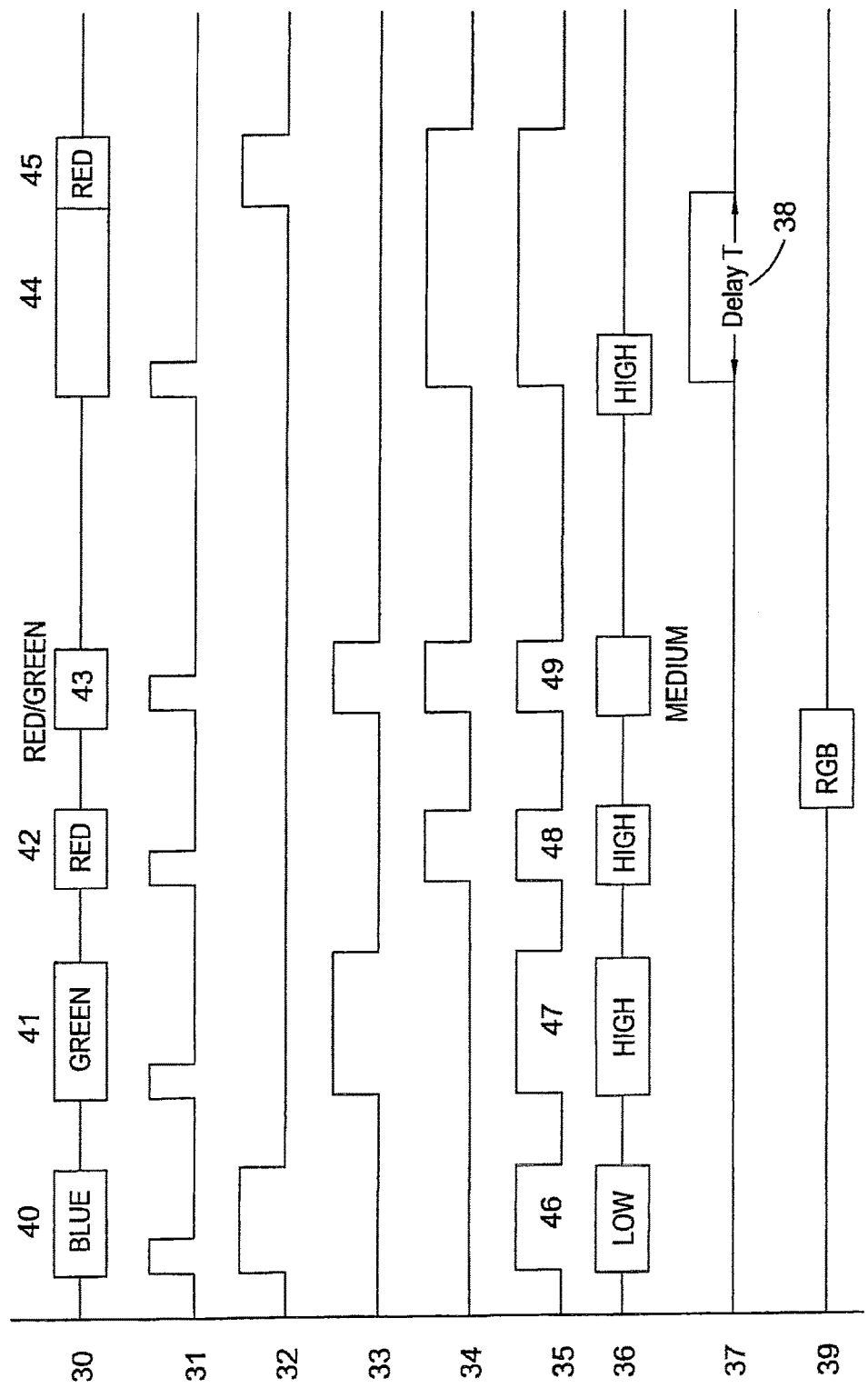

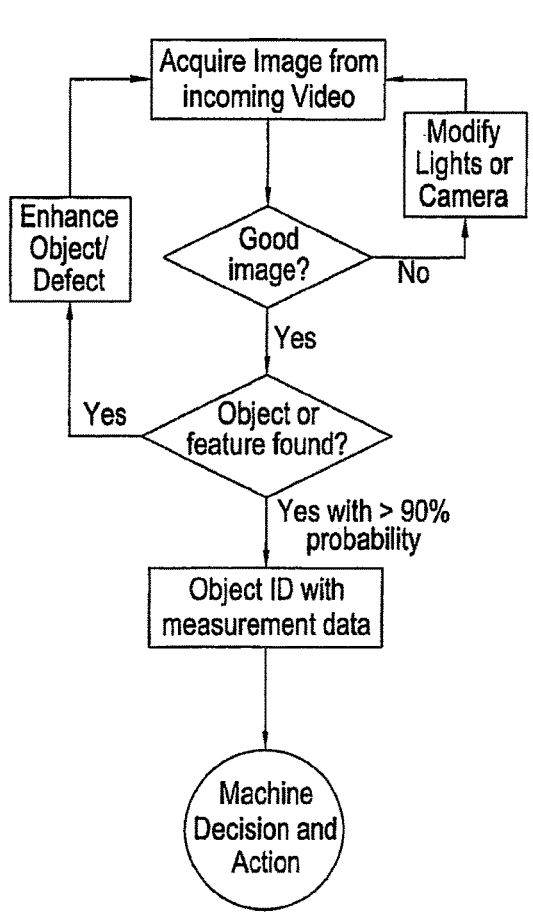

Acquire Image:

-The system aquires Frames from the video camera feed.

-Controllable and synchronised with light exposure

Good Image:

-The Frame (image) is analysed in the Vision Module for sharpness and exposure

-If the image Q is lower lower than 90, image is retaken with alternative parameters Object or feature Found -Good images are searched for edges, objects and specific defects (Learned)

-Image parameters are further optimised to achieve reliable identification

Object ID

-When the probability of a match is high (user defined), the object is recorded along with data on the object (extracted from the iamge)

Machine Decision

-Use the data to define machine path, perform further measurement or transmit data to base

Fig. 19

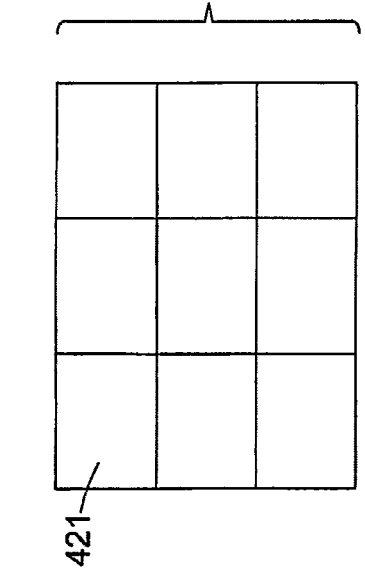
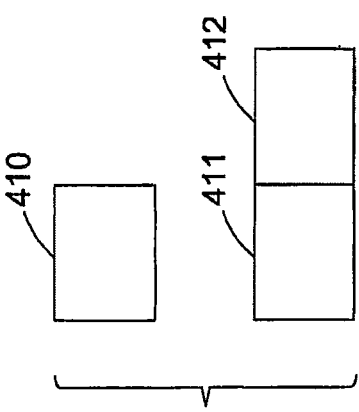
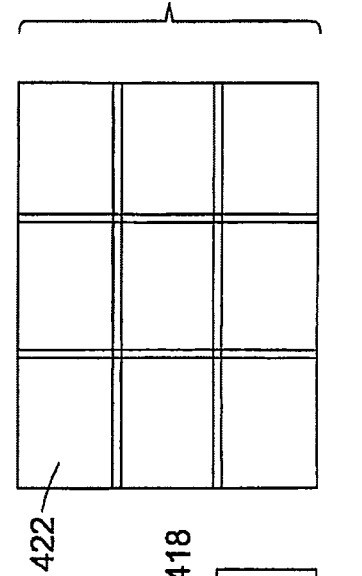
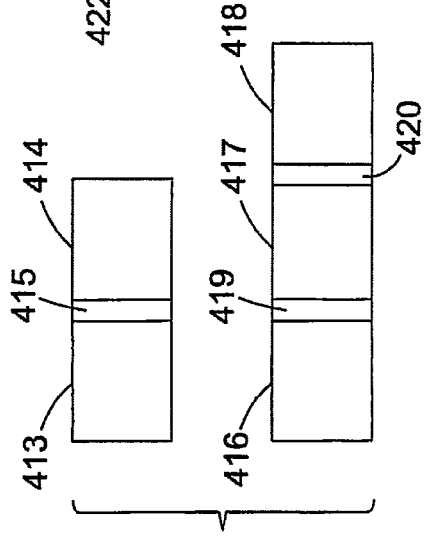

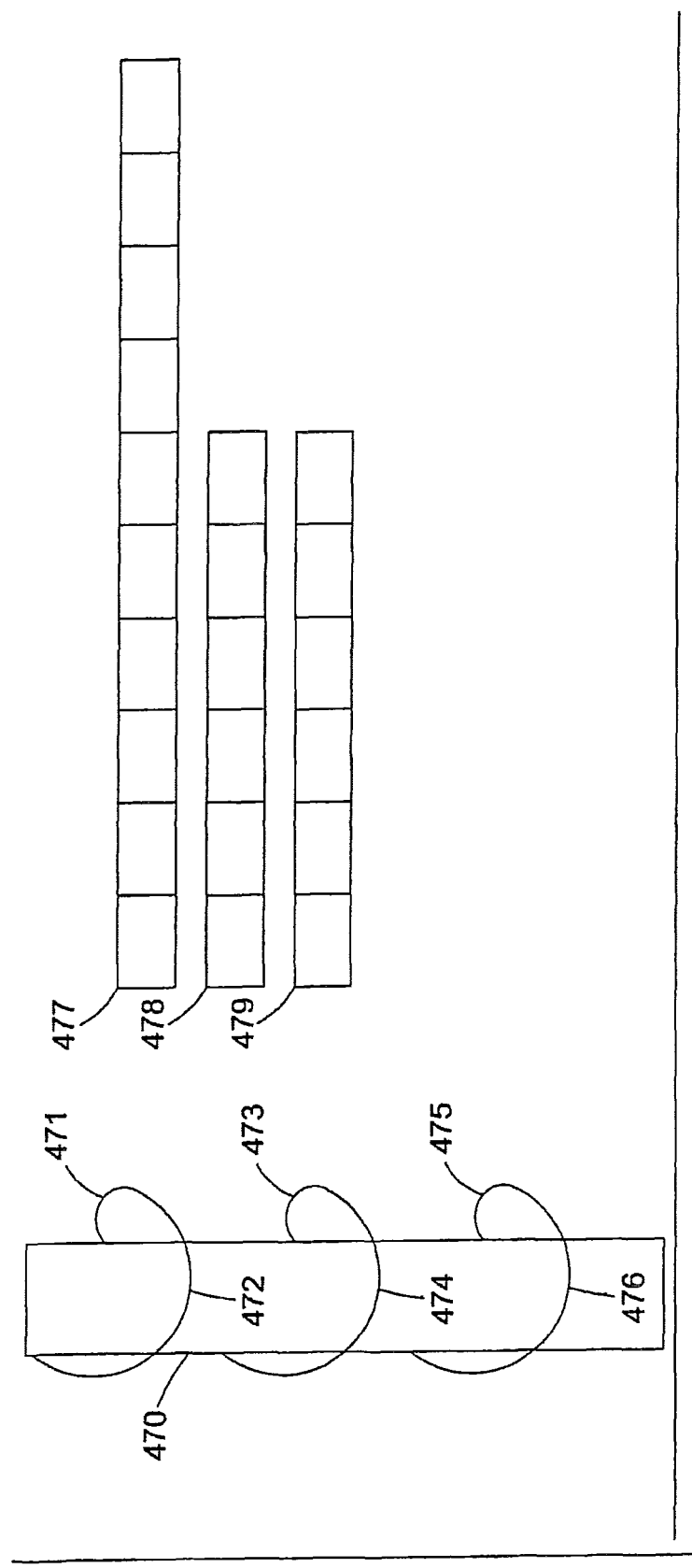

PROCESSING SURVEY DATA OF AN UNDERWATER SCENE

This application is a National Stage Application of PCT/EP2013/071807, filed 17 Oct. 2013 and published as WO 2014/063999 A1, which claims benefit of Application Nos. 1218648.2, 1218630.0, and 1218644.1, each filed 17 Oct. 2012 in Great Britain and which applications are incorporated herein by reference.

This invention relates to underwater survey system and method for processing survey data.

BACKGROUND

Underwater surveying and inspection is a significant component of many marine and oceanographic sciences and industries. Considerable costs are incurred in surveying and inspection of artificial structures such as ship hulls; oil and cable pipelines; and oil rigs including associated submerged platforms and risers. There is great demand to improve the efficiency and effectiveness and reduce the costs of these surveys. The growing development of deep sea oil drilling platforms and the necessity to inspect and maintain them is likely to push the demand for inspection services even further. Optical inspection, either by human observation or human analysis of video or photographic data, is required in order to provide the necessary resolution to determine their health and status.

Conventionally the majority of survey and inspection work would have been the preserve of divers but with the increasing demand to access hazardous environments and the continuing requirement by industry to reduce costs, the use of divers is becoming less common and their place being taken by unmanned underwater devices such as Remotely Operated Vehicles (ROV), Autonomous Underwater Vehicles (AUV) and underwater sentries.

ROVs and AUVs are multipurpose platforms and can provide a means to access more remote and hostile environments. They can remain in position for considerable periods while recording and measuring the characteristics of underwater scenes with higher accuracy and repeatability.

An underwater sentry is not mobile and may be fully autonomous or remotely operated. An autonomous sentry may have local power and data storage while a remotely operated unit may have external power and data communications.

Both ROVs and AUVs are typically launched from a ship but while the ROV maintains constant contact with the launch vessel through an umbilical tether, the AUV is independent and may move entirely of its own accord through a pre-programmed route sequence.

The ROV tether houses data, control and power cables and can be piloted from its launch vessel to proceed to locations and commence surveying or inspection duties. The video data typically acquired can be stored locally but is normally transmitted back to the host through a high capacity data link in the tether which is often an optical fibre. For the AV, data is stored locally and only reaches the host after re-docking with the launch ship.

Traditional underwater imaging systems consist of a camera, a means of illumination for lighting purposes and a video system for recording and displaying the scene and to allow storage of the images for future analysis. The illumination means traditionally consist of Halogen lights, HID lights or HMI lights. In an ROV, the lights would be manually controlled by the operator to improve image quality. The cameras typically used have frame rate of 50-60 frames per second (fps).

Video data is recorded and stored in original format for review. Other data such as position, navigation and sonar are also typically recorded and are used to assist these operations. However, optical visibility remains the most important consideration for the efficient conduct of surveying and maintenance operations.

The video stream may be viewed in real time by an operator on board or stored for later review. In some case, data may be transmitted from a survey ship at sea back to another location using a satellite link.

A common use for such ROVs and AUVs is imaging of subsea pipelines and submerged structures associated with oil rigs, for monitoring and maintenance purposes. In such situations, the vehicle will be manoeuvred along the length of the object in question, so as to obtain a complete image thereof.

Transmission of light in water is well characterized and reasonably well understood, in that light at wavelengths corresponding to the blue/green region of the spectrum between 350-550 nm suffers much less absorption, and hence is preferentially transmitted, compared with light in the red region of the section beyond 600 nm. This differing absorption contributes to the resulting blue/green colour that is commonly observed of water.

Traditional underwater imaging is based on the same principles as land based imaging, where video and a white light are used with a colour sensitive, Bayer filtered or 3CCD camera to create a colour image or sequence of images for video. However, it is important to note that Bayer filters reduce the resolution of the captured image, while 3-chip CCD cameras are bulky.

There are a number of specific environmental issues with underwater imaging that have an impact on image quality, for example as mentioned, colour absorption in water. Given typical frame rates of 50 fps, maximum exposure times, which are constrained by the frame rate, of 20 ms are usual. Accordingly, during one frame or image acquisition period it is possible for there to have been relative motion of 20 mm, which can result in blurring, which in turn may have an impact on image quality under certain conditions of object field size, sensor size and magnification.

Particles and backscattered light form floating or moving particles in the field of view are another example of image quality issues in underwater imaging caused by environmental conditions, one that can have a significant impact on the images acquired.

Due to the cost of conducting underwater surveys it is important to maximise the information content of any acquired data and the use of high resolution cameras with sensor sizes of 1920×1080 pixels, compatible with HD TV systems, is increasingly common. Faithful colour capture is a significant concern during any underwater surveying. In order to maintain a high spatial resolution while simultaneously capturing accurate colour information, three chip colour cameras are sometimes used. In such cameras, the incoming light is split into three beams and directed into three separate sensors to capture the red, green and blue components. Maintaining the same spatial resolution requires that each of the red, green and blue sensors must also have a pixel count of 1920×1080. Such a camera captures 5.9 megapixels (Mpx) per frame. Allowing for 1 byte of storage per pixel means that a single frame captured from such a camera would require 5.9 MB of storage. At a progressive scan HD frame rate of 60 Hz, one second of video would require approximately 360 MB and one hour would require 1.25 TB. While conventional image and video compression techniques, such as those used to generate MPEG4 files, are routinely used to reduce the storage and transmission overhead so as to allow about one hour of standard HD video be stored in 2 GB, these techniques may not always be suitable for compressing survey data. Other camera sensors exist that have even higher resolutions and these may be used in some proprietary systems, resulting in even larger volumes of data produced and requiring suitable storage.

It is clear that extensive surveying, at high resolutions, will obviously produce extremely large volumes of data. The storage and transmission of such volumes presents a significant cost to the surveying industry, especially in terms of bandwidth required to transmit the data from offshore locations over satellite communications. In addition to these costs are the labour overheads of the analysis of hours of video data by a human observer who must generally view the video survey in real time.

When performing a survey, determining the dimensions of an object in a survey image can be very important. However, this requires scale information which may be derived from calibration data that has been acquired previously. In such a situation any object within the field of view that is also within the depth of focus of the camera and optical system may have its size estimated by virtue of the known magnification factor associated with the optical system. However, many survey vehicles have optical systems with fixed focus arrangements and/or extensive depths of field which restrict the accuracy that can be reliably achieved when operating over large distances.

The demand for more high quality survey information has promoted the use of range finding techniques in certain applications. These underwater range finding techniques include sonar, LIDAR and time of flight measurements.

Sonar relies on an acoustic signal being generated and then recording the time it takes for a receiver to detect the reflected signal from an object or land mass under survey. More complicated detection schemes based on recording the spread of times over which an acoustic pulse is recorded at the detector allows the sizes of objects to be estimated.

LIDAR works similarly to conventional RADAR, except that laser pulses are used instead of radio waves. A pulsed laser is used to illuminate an object or scene. A detector records the arrival time of pulses reflected from the object or components of the scene. The delay between the transmission and receipt of the reflected pulses allows the range to the objects to be determined according to the formula of Range=c×Time Delay/2, where c is the speed of light in the medium of interest.

The accuracy of this technique is dependent on the resolution of the detection apparatus and has been mainly used for measuring distances on land. Its range underwater is limited to tens of meters due to the high absorption of light in water.

Time of Flight is a variant of LIDAR but is intended to provide much higher resolution through the use of short pulsed or modulated lasers. The timing measurements are, in general, more sophisticated to enable times as short as a few picoseconds to be determined which in turn allows spatial resolutions down to 1 mm to be achieved.

These scaling and ranging techniques all require specialised and complicated technology. They are expensive to develop, generally bulky and difficult to maintain. Furthermore, for underwater use, they require enhancements in processing for signal to noise improvements when compared to in air operation.

BRIEF SUMMARY OF THE DISCLOSURE

According to the invention there is provided a method of processing survey data of an underwater scene comprising acquiring an augmented image of each of a plurality of fields of view within the scene, wherein each augmented image comprises at least a scene image of the scene, a location tag associated with that scene image, metadata associated with that scene image; concatenating the scene images into a composite image based on the location tags associated therewith, including modifying the scene images to improve concatenation; and linking each scene image in the composite image to its augmented image.

In one embodiment of the invention there is provided a method wherein the step of concatenating the scene images into a composite image comprises forming a single image file.

In another embodiment of the invention there is provided a method in which the location tag associated with an augmented image comprises absolute location information.

In an alternative embodiment of the invention there is provided a method in which the location tag associated with one or more augmented image comprises location information relative to the absolute location information of another an augmented image.

In another embodiment of the invention there is provided a method in which the augmented image is a high resolution augmented image.

In one embodiment of the invention there is provided a method comprising the step of forming a selection composite image comprising concatenating a subset of the scene images of the composite image, each scene image linking to its augmented image.

In another embodiment of the invention there is provided a method comprising further modifying at least one of the subset of scene images.

In a further embodiment of the invention there is provided a method in which the step of modifying the scene images includes changing the resolution of the scene image.

In an alternative embodiment of the invention there is provided a method in which the step of modifying the scene images includes adjusting the scale of the scene image.

In one embodiment of the invention there is provided a method in which the step of modifying the scene images includes adjusting the pin-cushion or barrel distortion of the scene image.

In another embodiment of the invention there is provided a method in which the scene image is a white light image.

In a further embodiment of the invention there is provided a method in which the scene image is a sonar image.

BRIEF DESCRIPTION OF THE DRAWINGS

Embodiments of the invention are further described hereinafter with reference to the accompanying drawings, in which:

FIG. 7(a) is a timing diagram of a further exemplary operation of the method of the invention;

FIG. 7(b) is a timing diagram of a still further operation of the method of the invention;

FIG. 19 is flowchart outlining closed loop control of a sequential imaging method;

FIG. 21(a) is a diagrammatic representation of a single image of a first field of view, and a diagrammatic representation of a linear composite image of a pair of contiguous fields of view;

FIG. 21(b) is a diagrammatic representation of a grid composite image formed from images of contiguous fields of view;

FIG. 22(a) are a diagrammatic representation of a linear composite image of a pair of overlapping fields of view and a linear composite image of three overlapping fields of view;

FIG. 22(b) is a diagrammatic representation of a grid composite image formed from images of overlapping fields of view;

FIG. 25(a) is a diagrammatic representation of a survey of a vertical structure such as a riser where the survey vehicle helically observes the riser and records images;

FIG. 25(b) is a diagrammatic representation of the fields of view captured in the survey of FIG. 25(a)

DETAILED DESCRIPTION

Overview

Figure 1:
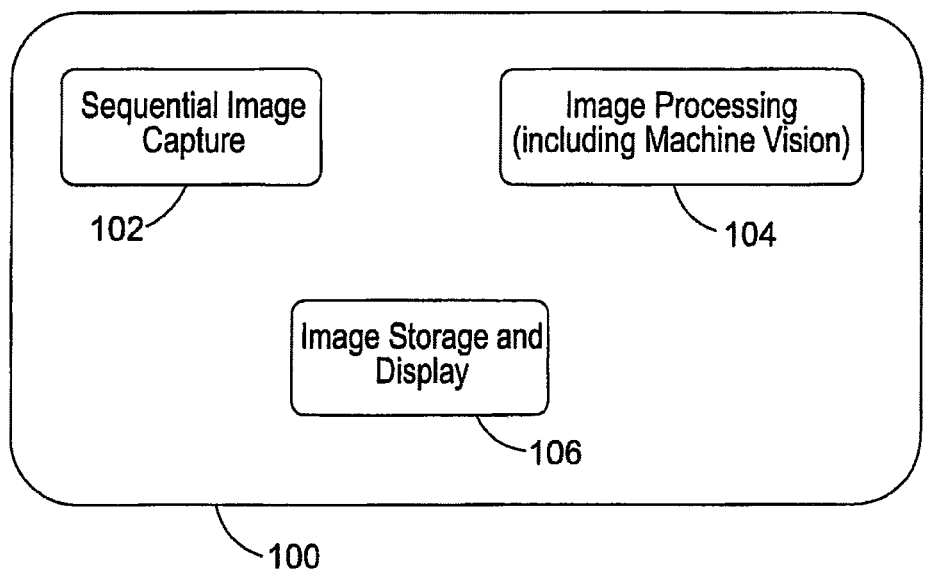
FIG. 1 is a block diagram of an underwater survey system in which the present invention operates.

The present invention relates to a system for use in carrying out underwater surveys, in particular those carried out by Remotely Operated Vehicles (ROVs), Autonomous Underwater Vehicles (AUVs) and underwater sentries. The invention is particularly useful for surveying manmade sub-sea structures used in the oil and gas industry, for example pipelines, flow lines, well-heads, and risers. The overall system comprises a method for capturing capture high quality survey images, including additional information not present in standard images such as ranges and dimensioning. Once captured, the system comprises techniques to manage and optimise the survey data obtained, and to present it to a user in an augmented manner.

The overall system implements an integration of image capture, telemetry, data management and their combined display in an augmented output image of the survey scene. The augmented output images may be viewed as a video stream or combined in to form an overall view of the surveyed area. Furthermore, the overall system provides an enhancement that allows structures, objects and features of interest within each scene to be highlighted and overlaid with relevant information. This is further coupled with measurement and object identification methods.

For capturing the images, the overall system comprises a method and system for capturing sequential images of substantially the same scene, wherein a plurality of images of the scene are captured, each using a different light class. Available light classes include white light, UV light, coloured light, structured light for use in ranging and dimensioning, lights of different polarisations, lights in different positions relative to the camera and so on.

As mentioned above, images may be captured in batches sequentially so that different images of the same field of view may be captured. These batch images may be combined to provide one augmented output image. In some cases, the batches may be used to fine tune the parameters for the later images in the batch or in subsequent batches.

Measurement data is acquired and processed to generate accurate models or representations of the scene and the structures within it, and which is then integrated with the images of the same scene to provide an augmented inspection and survey environment for a user.

In particular, laser based range and triangulation techniques are coupled with the illumination and scene view capture techniques to generate quasi-CAD data that can be superimposed on the images to highlight dimensions and positioning of salient features of the scene under view.

Machine vision techniques play an important role in the overall system, allowing for image or feature enhancement; feature extraction, pattern matching and so on.

The overall system also comprises a method and system for gathering range and dimensional information in underwater surveys, which is incorporated into the method of sequential imaging outlined above. In the system, the light classes include at least one reference projection laser source which is adapted to generate a structured light beam, for example a pair of parallel laser lines. The dimensioning method comprises capturing an image of the scene when illuminated by white light, which image will form the base for the augmented output image. The white light image may be referred to as a scene image. Next an image is captured with the all other light classes turned off and the reference projection laser source turned on, such that it is projecting the desired structured light beam. This image shows the position of the references lines within the field of view. Processing of the captured image in software using machine vision techniques provides range and scale information for the white light image which may be utilised to generate dimensional data for objects recorded in the field of view. Additionally, the pair of laser lines may provide information on range to the objects in the field of view and the attitude of the survey vehicle relative to the seabed. Structured light in the form of one or more spots, lines or grids generated by a Diffractive Optical Element (DOE), Powell Lens, scanning galvanometer or the like may be used. Typically, blue lasers are used as reference projection laser sources however green lasers may be used as well as or instead of blue.

Furthermore, for a system comprising a dual camera and laser line, grid or structured light beams within a sequential imaging system, it is possible to perform metrology or inspection on a large area in 3D space in an uncontrolled environment, using 3D reconstruction and recalibration of lens focus, magnification and angle.

Capturing augmented survey images is one aspect of the overall system. A further function of the system comprises combining images into a single composite image and subsequently allowing a user to navigate through them, identifying features, while minimising the data load required. Processing of the image and scale data can take place in real time and the live video stream may be overlaid with information regarding the range to the objects within the field of view and their dimensions. In particular the 3D data, object data and other metadata that is acquired can be made available to the viewer overlaid on, or linked to the survey stream by the overall system. The system can identify features or objects of interest within the image stream based on a known library, as described in relation to processing survey data of an underwater scene. When a specific object has been identified, additional metadata may be made available such as a CAD including dimensions, maintenance records, installation date, manufacturer and the like. The provision of CAD dimension data enables the outline of the component to be superimposed in the frame. Certain metadata may not be available to an AUV during the survey, but may be included at a later stage once the AUV has access to the relevant data libraries.

In addition, telemetry based metadata, such as location, may also be incorporated into the augmented output image.

Referring to FIG. 1, there is shown a block diagram of the overall system 100 as described herein. The overall system 100 comprises a sequential imaging module 102, an image processing module 104 which includes a machine vision function, and an image storage and display module 106. In use, images are captured using sequential imaging, analysed and processed to from an augmented output image by the image processing module 104; and stored, managed and displayed by the image storage and display module 106.

Terminology

There is provided a below a brief discussion on some of the terminology that will be used in this description.

Throughout the specification, the term field of view will refer to the area viewed or captured by a camera at a given instant.

Throughout the specification, the term region of interest will refer to the displayed area of an image file.

Light class refers to one or more light sources that provide the same type of illumination of a scene as defined by wavelength, polarisation, coherency and the like. Light classes may have sub-classes for situational features of the light source including power level, position relative to the camera, angle relative to the camera and so on.

Frame rate: the number of frames acquired in one second.

Exposure: This determines how long a system spends acquiring a single frame and its maximum value is constrained by the frame rate. In conventional imaging systems, this is usually fixed. Normally it is 1/frame rate for "full exposure" frames, so a frame rate of 50 frames per second would result in a full frame exposure of 20 ms. However, partial frame exposures are also possible in which case the exposure time may be shorter, while the frame rate is held constant. In some circumstances it is also referred to as Frame Width.

Frame delay: This is the time between a clock event that signals a frame is to be acquired and the actual commencement of the acquisition. In conventional imaging systems this is generally not relevant.

Trigger event: A trigger event is not defined by the internal clock of the camera system and may be generated by an external event or may be generated in order to meet a specific requirement in terms of time between images.

Integration Time: Conventionally the integration time of a detector is the time over which it measures the response to a stimulus to make an estimate of the magnitude of the stimulus. In the case of a camera it is normally the exposure time. However certain cameras have limited ability to reduce their exposure times to much less than several tens of microseconds. Light sources such as LEDs and lasers can be made to pulse with pulse widths of substantially less than a microsecond. In a situation where a camera with a minimum exposure time of 50 microseconds records a light pulse of 1 microsecond in duration, the effective integration time is only 1 microsecond and 98% shorter than the minimum exposure time that can be configured on the camera.

Light pulse width: The width of a pulse of light in seconds. The pulse of light may be longer than or shorter than the exposure.

Light pulse delay: The delay time between the trigger event and the start of the light pulse.

Power: The power of light within a given pulse is controlled by the control module and can be modulated between zero and the maximum power level possible. For an imaging system with well corrected optics, the power received by the sensor and the noise level of the sensor determine the image quality. Additionally, environmental factors such as scattering, absorption or reflection from an object, which can impair image acquisition, may require that the power is changed. Furthermore, within an image, parts of objects within a scene may reflect more light than others and power control over multiple frames may allow control of this reflection, thereby enabling the dynamic range of the sensor to be effectively increased. Potentially, superposition of multiple images through addition and subtraction of parts of each image can be used to allow this.

High dynamic range, contrast enhancement and tone mapping techniques can be used to compensate for subsea imaging challenges such as low visibility. High dynamic range images are created by superimposing multiple low dynamic range images, and can provide single augmented output images with details that are not evident in conventional subsea imaging.

Colour or wavelength: The wavelength range of light visible to the human eye is between 400 nm blue and 700 nm red. Typically, camera systems operate in a similar range however, it is not intended that this invention is limited to human visible wavelengths only; as such camera systems can be generally used with wavelengths up to 900 nm in the near infra-red, while the range can be extended into the UV region of the spectrum with appropriate phosphors.

Structured light beam may be understood to refer to beam having a defined shape, structure, arrangement, or configuration. It does not include light that provides generally wide illumination. Similarly, a 'structured light source' may be understood to refer to a light source adapted to generate such a beam. Typically, a structured light beam is derived from a laser, but may be derived in other ways.

Sequential Imaging

Figure 2:
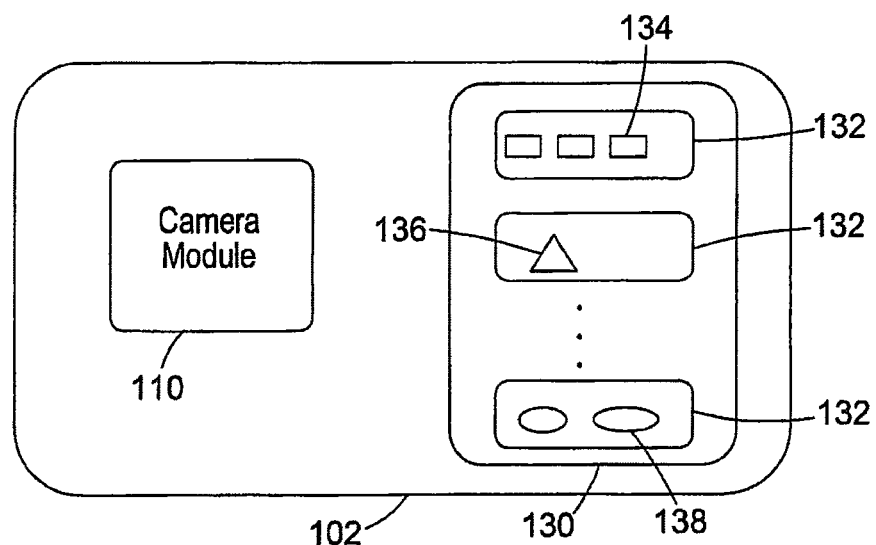
FIG. 2 is a block diagram of a sequential imaging module according to the invention.

The prior art sub-sea survey systems provide the user with a video output for review by an ROV pilot. As such, the present system is adapted to also provide a video output. Referring to FIG. 2, there is shown a block diagram of the sequential imaging module 102. The sequential imaging module comprises a light module 130 and a camera module 110, the light module 110 comprising a plurality of light classes 132, each light class having one or more light sources 134, 136, 138. The sequential imaging module would in general comprise three or four light classes, when intended for use in standard surveys. However, more light classes may be included if desired. An exemplary sequential imaging module 102 comprises a light class for illuminating a scene with white light; a blue line laser light class; and a UV light class. Additional classes might include red, green or blue, green lasers lines, a light source for emitting structured light which is offset from the angle of the camera sensor.

Figure 3:
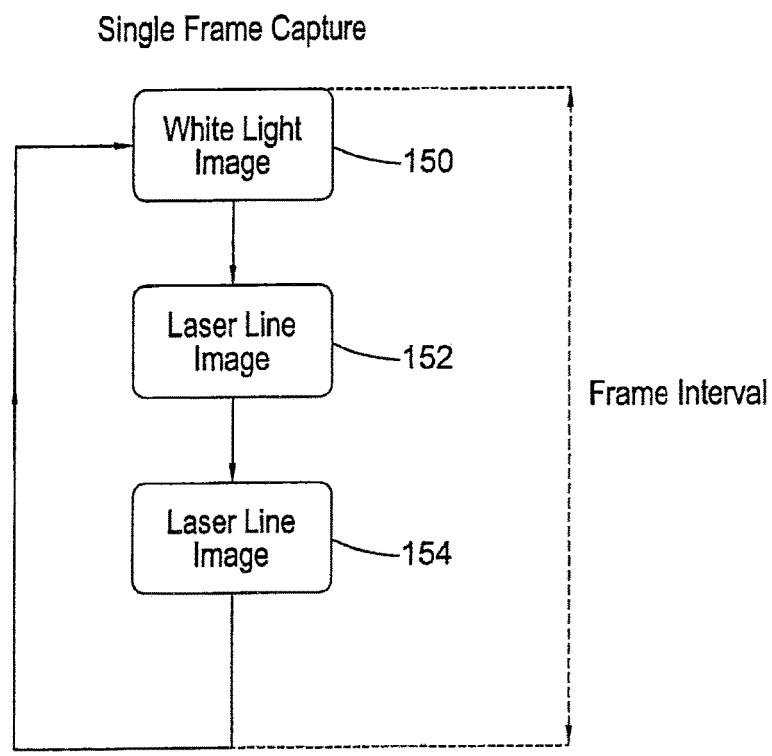
FIG. 3 is a flow chart illustrating the steps in an exemplary method according to the invention.

FIG. 3 is a flow chart of the operation of the exemplary sequential imaging module in carrying out a standard survey of an undersea scene, such as an oil or gas installation like a pipeline or a riser. The flow chart provides the steps that are taken in capturing a single frame, which will be output as an augmented output image. When in use on an ROV, the augmented output images as output as a video feed, however, for operation in an AUV the images are stored for later viewing. In step 150, an image of the scene is captured while illuminated by white light from the light module. Next, in step 152, a pair of blue laser lines are projected onto the scene, in the absence of other illumination from the light module, and an image is captured of the scene including the laser lines. Next, the scene is illuminated by UV light and an image is captured of the scene. As the output of the sequential imaging process is intended to be viewable as a standard video stream, each captured image is not displayed to the user. Such a display would be confusing and unpleasant to the user. Therefore, the white light images form the basis for the video stream, with the laser line and UV images being used to capture additional information which is used to enhance and augment the white light images. In order to provide an acceptable video stream, a reasonably high frame rate must be achieved. A suitable frame rate is 24 frames per second, requiring that the steps 150, 152 and 154 be repeated twenty four times each second. A frame rate of 24 frames per second corresponds to standard HD video. When in use in an AUV, a lower frame rate may be implemented as it is not necessary to provide a video feed.

It is also possible to set the frame rate according to the speed of the survey vehicle, so as to ensure a suitable overlap between subsequent images is provided.

At a frame rate of 24 fps, the frame interval is 41.66667 ms. The survey vehicle moves quite slowly, generally between 0.5 m/s and 2 m/s. This will mean that the survey vehicle moves between approximately 20 mm and 80 mm in each frame interval. The images captured will therefore not be of exactly the same scene. However, there is sufficient overlap, around 90% and above, between frames that it is possible to align the images through image processing.

Each image captured for a single output frame will have an exposure time of a few milliseconds, with a few milliseconds between each image capture. Typical exposure times are between 3 ms and 10 ms., for example a white light image may have an exposure time of 3 ms, a laser line image might have an exposure time of 3 ms, and a UV image might have an exposure time of 10 ms, which approximately 1 ms between each exposure. It will be understood that the exposure times may vary depending on the camera sensor used and the underwater conditions. The lighting parameters may also be varied to allow shorter exposure times.

The sequential imaging module 102 is concerned with controlling the operational parameters of the light module and camera module such as frame rate, exposure, frame delay, trigger event, integration time, light pulse width, light pulse delay, power level, colour, gain and effective sensor size. The system provides for lighting and imaging parameters to be adjusted between individual image captures; and between sequences of image captures corresponding to a single frame of video. The strength of embodiments of the method of the invention can be best understood by considering the specific parameters that can be varied between frames and how these parameters benefit the recording of video data given particular application based examples.

Before image capture begins, the camera sensors are calibrated to any allow distortions such as pin cushion distortion and barrel distortion to be removed in real time. In this way, the captured images will provide a true representation of the objects in the scene. The corrections can be implemented in a number of ways, for example, by using a look up table or through sequential imaging using a calibrated laser source. Alternatively, the distortions may be removed by post-capture editing.

Figure 4:
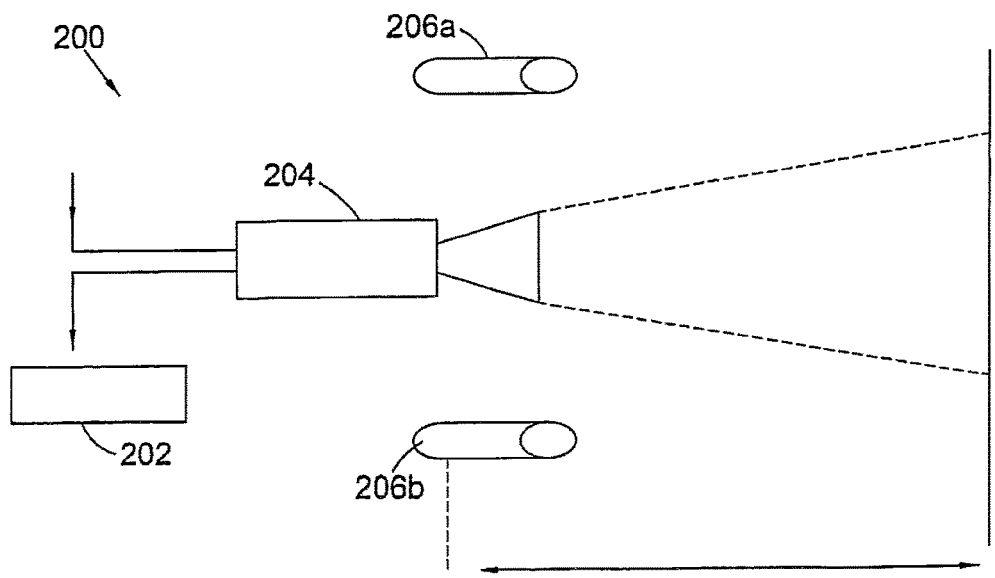
FIG. 4 is a diagrammatic side view of an exemplary system for use with the method of the invention.

Referring now to FIG. 4, there is shown a diagrammatic representation of an underwater imaging system, indicated generally by the reference numeral 200, for use with embodiments of the method of the invention. The system 200 comprises a control module 202 connected to a camera 204, and a pair of light sources 206a, 206b. One light source 206a is located above the camera 204, while the other light source 206b is located below the camera 204. The lens 208 of the camera and the light sources 206a, 206b are directed at a scene 210. Each light source may represent of light sources within a light class.

Typically, the camera 204 begins acquiring images as soon as the light sources 206 are turned on by a DC power supply (not shown) in response to an enable signal from the control module 202. An image is captured in response to an exposure timer trigger after every exposure period, wherein image capture comprises measuring the signals from the individual pixels of the camera 204, measured over the exposure time.

Figure 5:
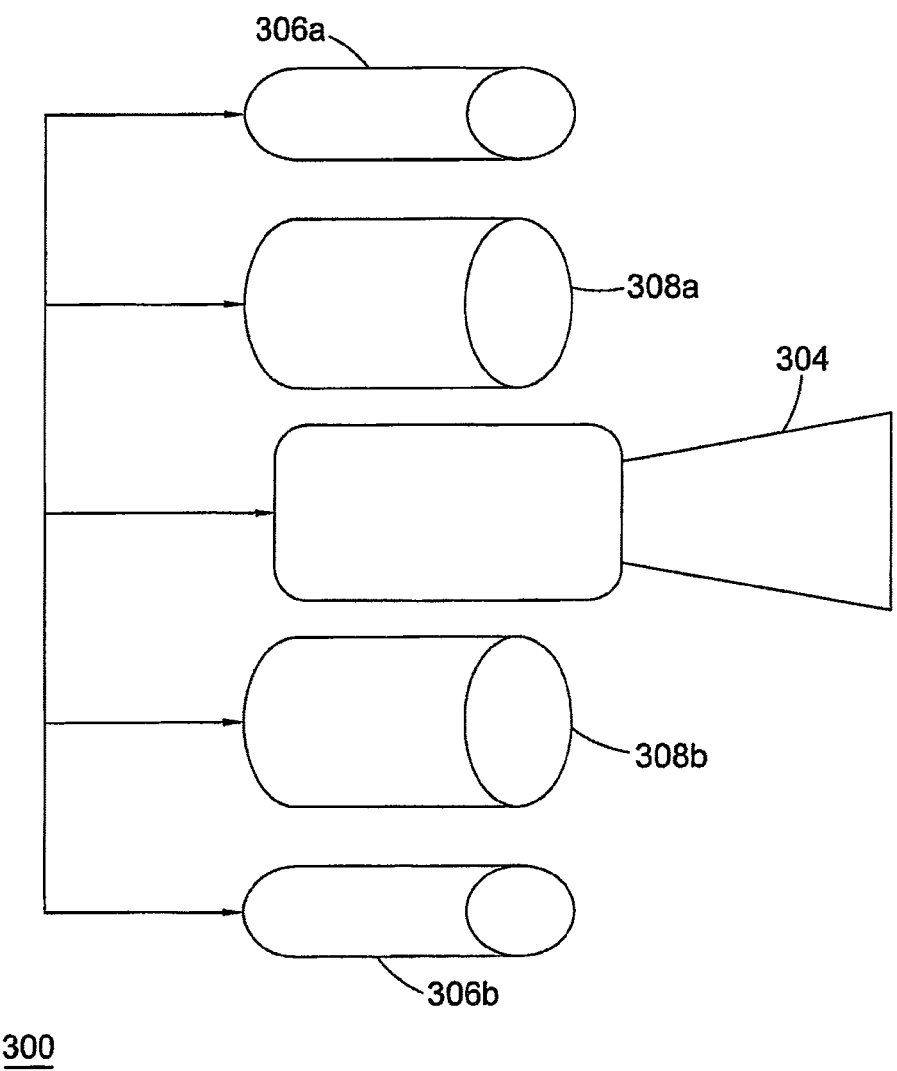
FIG. 5 is a diagrammatic side view of an alternative system for use with the method of the invention.

Referring now to FIG. 5, there is shown a diagrammatic representation of an alternative underwater imaging system, indicated generally by the reference numeral 300, for use with embodiments of the method of the invention. In this diagram the control module is not shown, however a camera 304 can be seen, as well as four light sources 306a, 306b, 308a, 308b from two different light classes 306, 308. The light sources 306a, 306b, 308a, 308b and camera are all directed straight forward. The camera module 304 and light sources 306a, 306b, 308a, 308b are synchronized, via the control module so that each time an image is acquired, a specific configuration and potentially differing configuration of light source parameters and camera module parameters is used.

It will be understood by the person skilled in the art that a number of configurations of such a system are possible for subsea imaging and robotic vision systems, suitable for use with embodiments of the method of the invention.

Figure 6B:
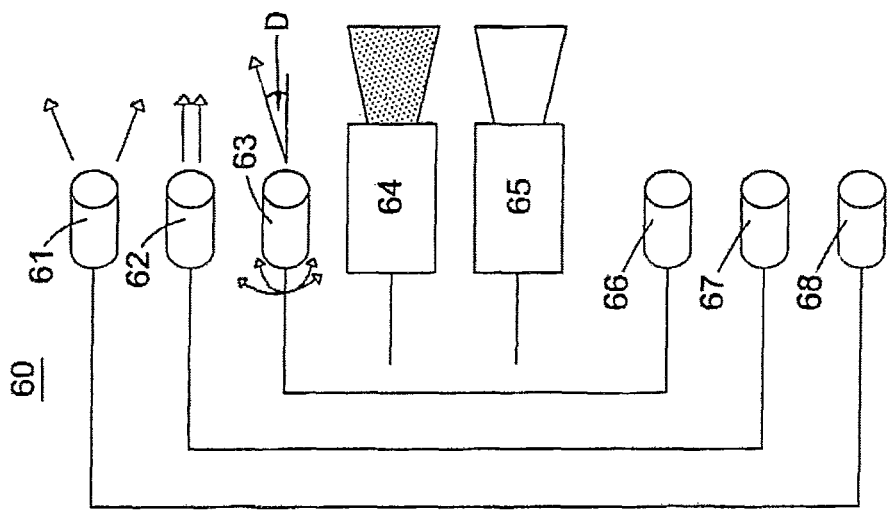
FIGS. 6(a) and (b) are a diagrammatic side view of a further exemplary system for use with the method of the invention, and a timing diagram of an exemplary operation of the method of the invention respectively.
Figure 6A:
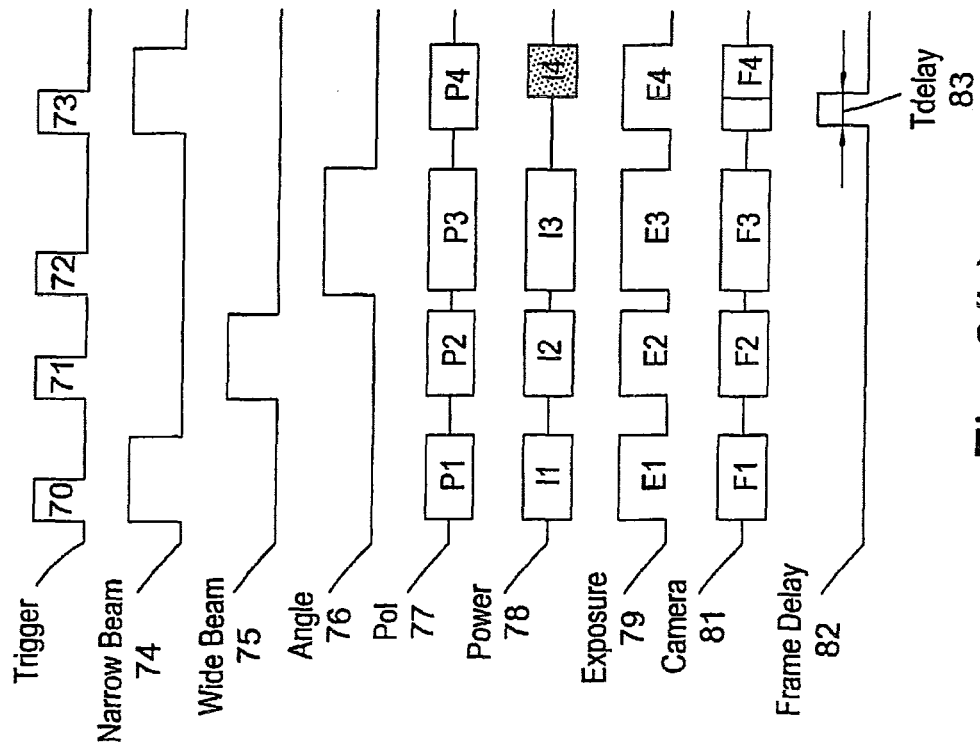

FIG. 6(a) shows an array of light sources 61, 62, 63, 66, 67, 68 and a camera module comprising two imaging systems 64, 65 of a notional underwater ROV, where one of the imaging systems 64 is be a pilot camera to provide live video feeds. The cameras may be high resolution CMOS, sCMOS, EMCCD or ICCD cameras with in excess of 1 Mega pixels and typically 4 Mega pixels or more. In addition, cooled cameras or low light cameras may be used. It is also possible to use a single imaging system and split its signal so as to provide both a live feed and a signal to be processed. For illustrative purposes the set is shown to comprise six light sources 61, 62, 63, 66, 67, 68, which may be of different classes. Each light source 61, 62, 63, 66, 67, 68 can have their polarization modified either through using polarizers (not shown), or waveplates, Babinet-Soleil compensators, Fresnel Rhombs or Pockel's cells, singly or in combination with each other. The light sources 61, 62, 63, 66, 67, 68 may have a wide angle 61 and may point in a number of differing directions 63. Alternatively, the light sources may have a narrow angle spotlight 62, 67 with the intention of imaging from a longer range. By narrowing the angle, power density at points up to the focal distance is increased. From an imaging perspective, in order to obtain efficient and good quality images the imaging cone, as defined by the focal length of the lens, should match closely with the light cone. Potentially the imaging system could be of a variable focus in which case this cone can be varied and could allow a single light source to deliver the wide and narrow angle beams. The ability to switch between lights or groups of lights according to their output angle, and therefore the area of illumination, is highly beneficial as it can enhance edges and highlight shadowing. Likewise, where a camera is mounted on a sentry system, it may be required to use alternate fixed lighting from a number of directions to highlight or to enhance an image.

The timing sequences of FIG. 6(b) show some of these specific scenarios for a red light source where there is a first trigger 70 and the user or the control module has determined that the narrow beam light source 74 is to be used to illuminate a scene, with a power level 78 I1 and a polarization 77 P1 for an exposure period E1 to acquire an image frame F1 from the camera 79. Similarly other acquisitions occur with other light sources such as the wide beam light source 75 with trigger 71 and exposure time E2, power I2 and polarization P2 different to the previous acquisition. Hence it is possible to modify the beam parameters, power and polarization to acquire an optimal image of the scene under view. In a further enhancement it can be seen that it is possible to reduce the effective illumination period with the use of a Frame Delay trigger 82 that, when active, suppresses the turn on of the light source and thereby allows exposure times shorter than those which the camera electronics are capable of producing.

FIG. 7(a) illustrates a generalized timing diagram for an exemplary configuration and demonstrates the use of discrete, multiple and spectrally distinct, monochromatic solid state lighting sources and the associated control of the modulation and slew rate of the individual lighting sources.

In the non-continuous pulsed lighting timing sequence diagram of FIG. 7(b), a camera 30 or similar sensor acquires data in response to a trigger event 31 for a time defined by the exposure time 35. In the first acquisition 40 a blue solid state light 32 is turned on for the exposure time 46 with a particular set power 36. For illustrative purposes here it is set at an arbitrary LOW level but it should be understood that typically this parameter may have 256 levels of quantization associated with an 8 bit signal, or more if required. In the second acquisition a green solid state light 33 is turned on with an arbitrary HIGH level of power for an exposure time 47, different to the previous acquisition and the duration of which is pre-set within the control module based on a priori knowledge of the aquatic environment or determined automatically, based on analysis of the current environment; interpretation of previously acquired data; or any single or multiple combination thereof. During the third acquisition a red solid state light source 34 is turned on for an exposure time 48, again potentially different to previous exposures with an arbitrarily high power level. These three exposures can then be combined in a processed superposition by the control system to produce a full colour RGB image 39 which through the choice of exposure times and power settings and knowledge of the aquatic environment allows colour distortions due to differing absorptions to be corrected.

In a subsequent acquisition 43 both a red 34 and green 33 solid state light sources are powered on with a medium level of power, but it should be understood that the power levels of both sources could be independently set to any value within the 100% modulation depth. The light sources are on for the duration of the exposure time 49, which may be different to any of the previous exposure times and is similarly pre-set or set dynamically by the control module automatically. In a final acquisition the camera or sensor is triggered to begin acquiring data but the turn on of the red solid state light source 34 is delayed by a Frame Delay 37 for a delay time T 38 after the trigger acquisition. The integration time of the sensor is now no longer solely the exposure time but the difference between the exposure time and the frame delay time T and thereby enabling effective physical exposure times shorter than those that the sensor electronics can produce. In a further advance on this position it is possible to generate ultra-short stroboscopic effects through judicious choice of solid state laser light sources. LED and lasers can be configured to produce pulses of very short duration. If an object was being imaged and it was moving with a velocity likely to result in blurring even at the shortest available exposure time, it may be possible to image the object without blurring by illuminating it with a short pulse of LED or laser light.

According to a further aspect of the invention, it is possible to use multiple light sources of differing colours in a system and to vary light control parameters individually or collectively between frames. By way of example, for underwater imaging, there is a strong dependence of light transmission on wavelength. As discussed, the absorption spectrum in water is such that light in the region around 450 nm has higher transmission than light in the red region of the spectrum at 630 nm. The impact of this absorption is significant when one considers the range of transmission of blue light compared to red light in sea water.

An estimate of the power loss from two identical lights at two different wavelengths travelling through water can be made based on the Beer-Lambert law and using published figures for the absorption coefficient in each case. [$\alpha_{450nm}$=9.2×10$^{-3}$ m$^{-1}$, $\alpha_{630nm}$=2.9×10$^{-1}$m$^{-1}$, Pope & Fry 1997]

For the purpose of comparing red and blue light transmission in water, this relative calculation is adequate. However, absorption, scattering, beam angle and other factors need to be considered for a more accurate model. This simple model sheds light on the scale of the impact of this wavelength dependence by comparing relative transmission distances. Based on the figures of reference Pope and Fry, Appl. Opt. 36 8710 1997 for the absorption coefficients of pure water and by defining the Transmission Distance as the distance over which the power in the beam is reduced to 5% of the initial intensity, it is possible to calculate the transmission distances in each case. In an example of a blue light source and a red light source, having identical power and spatial characteristics, the initial power of the blue light will be attenuated to 5% of its value after propagating 324 m in the subaquatic environment, while the red light will be attenuated to 5% of its value after propagating only 10 m. This disparity in transmission is the reason why blue or green light are the dominant colours in underwater imaging where objects are at a range greater than 10 meters. Embodiments of the method of the invention can improve this situation by increasing the power level of the red light source, and so increasing its transmission distance. Thus, the use of colour control using multiple light sources according to embodiments of the method of the invention can greatly improve colour resolution in underwater imaging.

In addition to light power and colour or wavelength spread, the polarization of light has an impact on both the degree of scattering and the amount of reflected light. For imaging applications where backscatter from objects in front of the imaging sensor represent blooming centres, the ability to reduce the power level of backscattered light is critical. This becomes more so as the total power level of the light is reduced or where the sensitivity of the sensor system is increased. By changing or setting the polarisation state of a particular solid state light source or by choosing one polarized light source over another, this reflection and therefore camera dynamic range can be effectively improved. Scattering from particles in the line of sight between the camera and the scene under survey reduces the ability to the detection apparatus to resolve features of the scene as the scattered light which is often specularly reflected is of sufficiently high intensity to mask the scene. In order to reduce the scattered intensity polarization discrimination may be used to attenuate the scattered light and improve the image quality of the scene under survey.

Power modulation of the sources will typically be electrically or electronically driven. However it is also possible to modify the power emanating from a light source by utilizing some or all of the polarizers, waveplates, compensators and rhombs listed above and that in doing so potential distortions to the beam of the light sources arising from thermal gradients associated with electrical power modulation can be avoided.

In another aspect of the invention, shadow effects and edges in a scene are often highlighted by lighting power levels, lighting angle, lighting location with respect to the camera and/or lighting polarisation. Each of these can be used to increase the contrast in an image, and so facilitate edge detection. By controlling an array of lights of a number of different angles or directions, augmented edge detection capability can be realized.

Use of machine vision, combined with image acquisition under each illumination condition, allows closed loop control of lighting, camera parameters until a red signal is obtained. After the red signal is obtained, real time adjustment of the red channel power and camera sensitivity (exposure, gain, cooling) can be performed until the largest possible red signal is detected. Additional range data may also be obtained through a sequenced laser line generator which can validate, or allow adjustment of, the red channel parameters on the fly and in real time. Where no red channel is detected, alternative parameters for range enhancement may be used.

Machine Vision

A key feature of the invention is the use of machine vision techniques to analyse the captured images and combine aspects from each image in a sequential image capture to form an augmented output image of the scene.

The first machine vision functionality is to detect the scale of the image. Fixed light sources are arranged to provide parallel illumination which serves as a reference to calibrate the field size being imaged. Preferably, this is done by using a structured light beam, for example, a pair of parallel laser lines. The lasers lines are a known, fixed distance apart, therefore by comparing that known distance to the images of the laser lines captured as part of the sequential imaging, it is possible to deduce the scale of the image.

Alternatively, using structured light from DOEs in combination with fixed light sources allows depth and range measurements to be conducted, according to embodiments of the invention. The structured light then provides a reference with a fixed angular spread. Having calibrated the field size being imaged, it is possible to measure the linear separation between nodal points in the structured light reference image, and hence, knowing the angular separation to determine the distance.

Alternatively the image processing core of the control module can utilize the magnification and field size information of the imaging optics along with the sensor area and pixel size to determine depth and image size. Both techniques may be used simultaneously to improve accuracy.

The machine vision functionality can also deduce the range of the objects in the scene from the camera. This can be carried out in a number of ways, described in relation to the use of structured lights beams as part of the sequential imaging.

Machine vision may also be used to detect survey objects within the scene. For example, by performing edge detection on the white light image, it is possible to detect the edges of pipelines, risers or the like. It is therefore possible to deduce the centre line of the pipeline, being halfway between the edges. These details can be useful in enhancing the output image, and may also be used a navigation guide by an ROV operator or an automatic navigation guide for an AUV.

Edge detection is also useful in detecting hydrocarbons. Hydrocarbons will fluoresce under UV light, therefore by performing edge detection on an image captured under UV light, blobs of hydrocarbons may be identified. The detected blobs of fluorescence may then be overlaid on another image of the scene in the augmented output image so as to highlight their presence. The objects extracted from the UV image may be overlaid on a white light image, a laser scan image or other suitable image as part of the augmented output image. In ROV operation, the detected fluorescence may be overlaid on the augmented output images forming part of the substantially real-time video output to the operator.

Having detected a pipeline, it is then possible to carry out measurements thereon, in conjunction with the scale information, and other analysis for example the presence of any cracks or like in the pipe surface.

Object detection is another useful machine vision tool for use in underwater surveys. Object detection may be used for detecting certain objects that are expected to be present in the survey such as valves, brackets, clamps, field joins and so on. Each augmented output image can then be tagged with the objects that are contained therein. Also the objects can be highlighted in the augmented output image. Furthermore, when combined with location information as to where the image was captured, it is possible to uniquely identify the particular object identified. This may be useful for comparisons with previous or subsequent surveys.

Object or blob detection is also useful for providing information in the augmented output image based on the features captures by the UV image. Oil leaks and certain types of biofouling with fluoresce under UV light. Therefore by analysing the UV image, any fluorescence can be detected and measured. The fluorescing portions of the UV image may be superimposed on or highlighted in the white light image as part of the augmented output image. It is also possible to calculate the area occupied by the fluorescence so as to provide an indication of the size of the oil leak or biofouling.

Machine vision may also be used to correlate adjacent still images into a larger combined still image.

In the absence of albedo information about the target, the measurement of the reflected power alone is insufficient to allow range information to be determined from a Beer-Lambert analysis. However when coupled with distance measurements, propagation loss data can be used to determine the albedo of the surface of the object being imaged. This data can be utilized to detect changes in the albedos of known objects' surfaces due to fouling or corrosion. Conversely, if the albedo of the target surface is known then range information may be calculated from the amount of light returned on reflection from the object in accordance with the Beer-Lambert law.

It will be understood by the person skilled in the art that a wide array of machine vision techniques may be used to analyse and derive useful data from images captured under the illumination of different light classes.

Telemetry & Navigation

While carrying out an inspection of a scene, a submersible vehicle operating according to embodiments of the method of the invention will comprise a location module. The location module can essentially keep track of the survey vehicle's location by logging its GPS launch location and then recording data from its anemometric, barometric and inertial sensors to maintain a {Yaw, Pitch, Roll}, distance and depth log. The invention allows tagging of individual images with local position data derived from the location module. The location module may also derive location information using techniques such as, optical laser range data, inertial sensor data, depth gauge data or any other situational awareness data including sonar image. Local position information may also be derived from Long Base Line (LBL) or Ultra Short Base Line (USBL) sonar positioning systems, which use transducers that provide relative position between transducers and a vehicle. In effect this is a local positioning system.

To work at its best, this requires that the telemetry device being probed is updated in real time or at least on a timescale equivalent to the rate at which images are acquired. In addition, the accuracy of these telemetry devices and their update speed will contribute to improvements in the repeatability of gathering these images in subsequent survey or measurement operations.

Certain structures which are surveyed are not rigid and can move relative to features depending on the environmental conditions. While knowledge of the absolute location of these structures is important it is also important for the analyses described here to be able to ascribe a relative position to components on each structure. Thus in recording a survey the absolute position is recorded along with a position along the structure to ensure that when comparing different surveys the absolute location is not being relied upon solely.

Tracking a vehicle movement underwater is complicated by the absence of a useful GPS signal due to the heavy attenuation of RF in that medium. To compensate a number of different methods and techniques are used.

In general the starting point or launch position of an underwater survey vehicle, such as an AUV or ROV or Sentry, is known as this will be from the surface or a known point underwater. Knowing this absolute position, the movements of the vehicle can then be tracked using a variety of inertial and hydrostatic sensors.

Hydrostatic sensors measure pressure at a point in a fluid. This is directly proportional to height under the surface of the fluid:

$$P = \rho g h$$

where $\rho$ is the density and g the acceleration due to gravity. Making the assumption that the water column above the AUV is uniform, the density will be a constant and hence the pressure will vary only with the height. Hence the vertical position of an AUV can be known to high accuracy.

Inertial MEMs sensors and accelerometers such as those routinely used in mobile phones can be utilised to record roll, pitch and yaw so any turning of the AUV can be recorded and any alterations to its heading noted.

In situations where the vehicle is not subject to net external forces but is moving at a constant velocity, an anemometer may be used to determine the instantaneous speed. Coupled with the hydrostatic and inertial sensor data, an instantaneous velocity can be determined and logged to maintain a position log relative to the start position and hence an absolute position can be determined.

In situations where a vehicle is surveying a structure and repeatedly doing so, images from previous surveys can be interrogated to provide further assistance in determining relative position by identifying known unique features and utilizing their known previous positions to calibrate the current position. This particular method can be utilized in situations where current drift is an issue.

As mentioned above, pipelines, risers or the like may detected by carrying out edge detection on captured images, where a number of parallel edges will likely indicate a pipeline or the like. Once the edges of the pipeline have been detected, the centre line of the pipeline can be detected. This can be provided to a ROV operator as a guide for the survey route. In an AUV, the centreline data may be used to navigate the AUV along the course of the pipeline. The position of the centre line of the pipe in the field of view of the camera is relayed as a coordinate set to the AUV control then, given that that the camera is in a fixed position on the AUV, the AUV can adjust its position with respect to the centreline of the pipeline.

Structured Light Based Metadata

Figure 8:
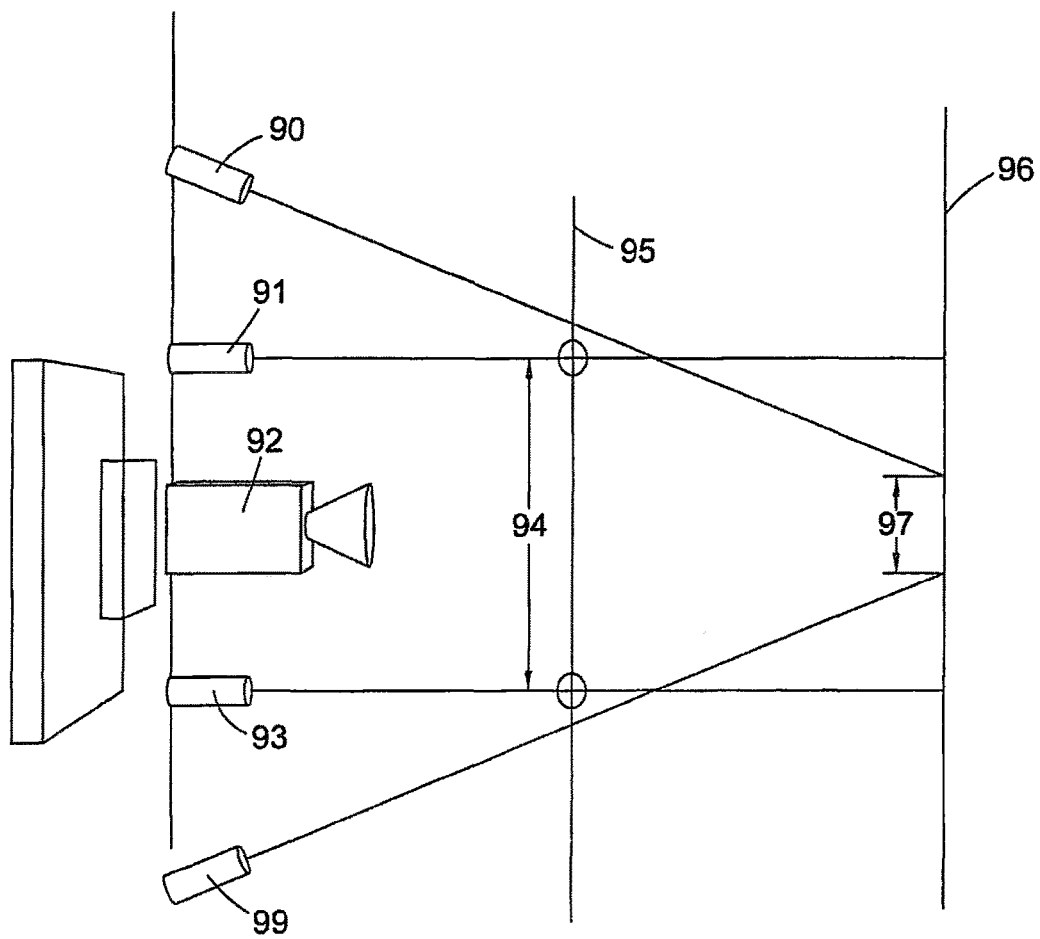
FIG. 8 is a diagrammatic side view of a system in which the method of the invention can be carried out.

Referring now to FIG. 8, there is shown an exemplary system comprising a camera and four light sources 90, 91, 93, 99 where multiple laser spots generated by one or more lasers 91, which are fixed in position and whose beam trajectories are maintained parallel to each other, are used to form a reference grid on a flat surface 96. There are significant advantages to being able to generate a line, a spot or multiple lines or spots of variable intensity. This is possible using an array of light sources, and can add significant information to an acquired scene. The use of one or more lines and or one or more spots allows for scaling, profile or measurement data to be obtained. Synchronising the spot or line source while all other light sources are turned off improves signal to noise ratios and detection capability as an image can be captured of the scene where only the reference grid or spots are visible in the scene and hence centroid detection and measurement is not impeded by the presence of illumination sources. Since the relative positions of the grid nodes are known it is possible to image a scene with the reference present and calibrate for distance by allowing a machine vision algorithm to process the image data. Controlling the brightness of the grid and turning other lighting sources off allows accurate data to be acquired of the grid nodes' centroids and hence more accurate measurements of the features of interest within the image.

Other reference patterns such as lines can be generated by cylindrical and Powell lenses. Grids of lines or points can be generated by the use of Diffractive Optical Elements (DOE) such as those from RPC Photonics or Holoeye. These allow a single laser to produce a grid or other structure where the separation between the nodes or reference points of the grid or structure is proportional to the distance from the DOE so when used in combination with the fixed grid described above allows triangulation measurements to be performed and range data to be obtained.

Figure 9:
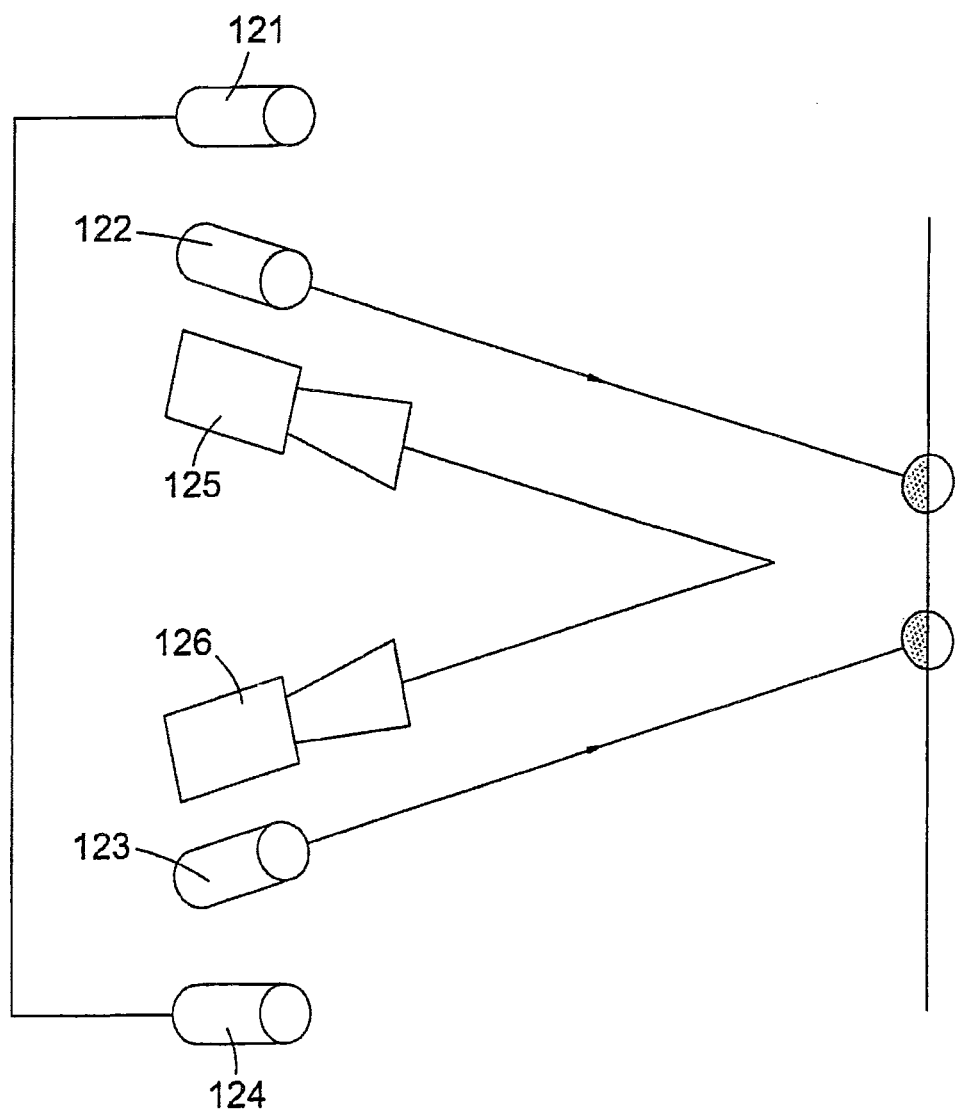
FIG. 9 is a diagrammatic side view of a further system in which the method of the invention can be carried out.

Referring now to FIG. 9, there is shown an embodiment of a system suitable for use in the method of the invention comprising a system of off-axis lighting components and multiple cameras. A series of light sources 121, 122, 123, 124 illuminate a scene that is being imaged by two cameras 125, 126. As with other examples listed earlier the light sources can be controlled to provide illumination at various angles and light fluxes providing augmented shadowing and contrast for the recording of stereographic images of the scenes. In this way, 3D stereo vision can be accomplished.

As an alternative to the above scenarios time of flight measurements are in some cases practical if the resolution required is on the order of 100 mm or more.

The use of reference projection light sources adapted to emit a structured light beams is discussed more in relation to FIGS. 10 to 18.

Figure 10:
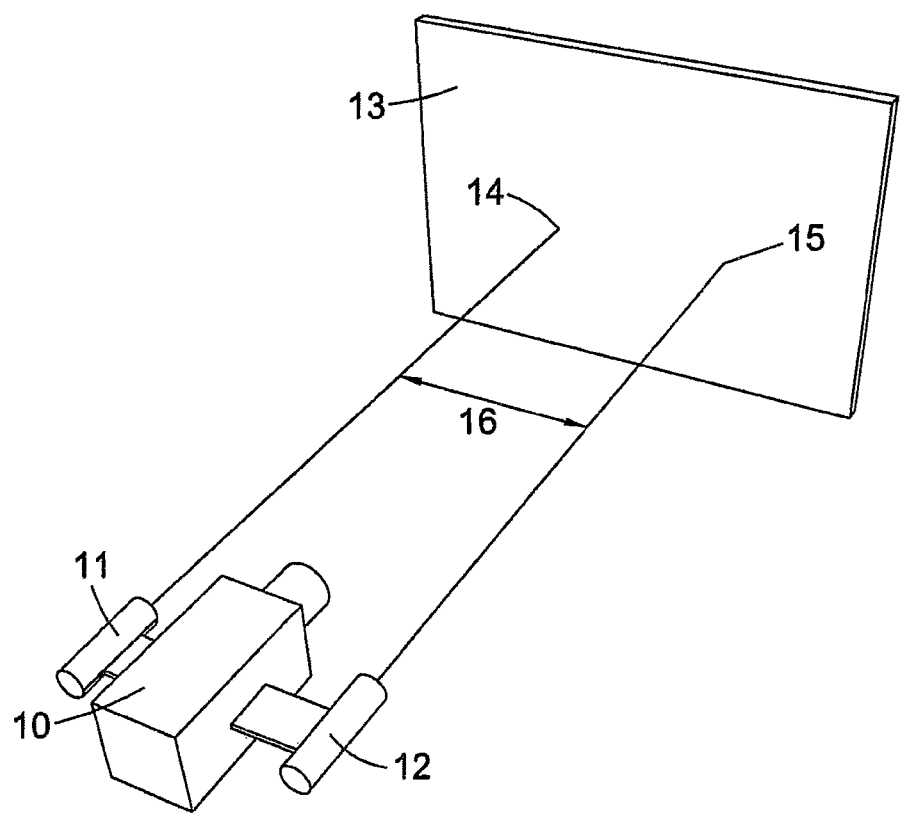
FIG. 10 is a diagrammatic representation of a system according to the invention to project two reference points on the surface of a structure to be surveyed.

Referring to FIG. 10, there is shown an exemplary embodiment for use in deducing dimension information comprising a camera 10 with a pair of reference projection light sources 11, 12 each adapted to emit a structured light beam 11, 12. The reference projection light sources 11, 12 are point beam generating lasers, affixed to the camera module and oriented in line with the camera, such that they are directed at the same scene as the camera module. The point beam generating lasers 11, 12 are attached to the camera module in a fixed, spaced-apart manner, such that their beams maintain a parallel path at all times. In practice, this configuration can be made quite compact, as there does not need to be a large distance between the two laser reference projection light sources 11, 12. Therefore it is possible for the reference projection light sources 11, 12 to be affixed to the sides of the camera module. The distance between the point beams is marked 16 on the figure. The camera module 10 records the position of two reference points 14 and 15, generated in the field of view 13, by the point beam generating lasers 11, 12. In recording the scene the positions of the two reference beams points 14, 15 will always be the same distance apart regardless of the size of the field of view or the distance from the sources 11 and 12. Hence, knowing the magnitude of the fixed separation enables determination of the sizes of objects within the field of view.

Figure 11:
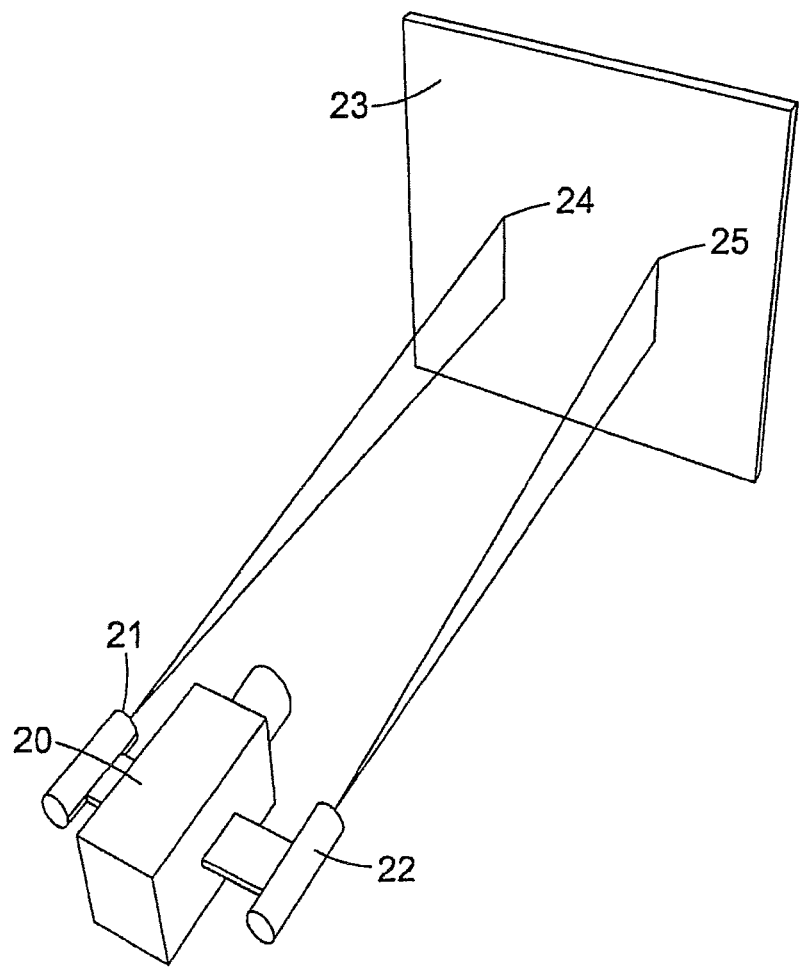
FIG. 11 is a diagrammatic representation of a system according to the invention to project two reference lines on the surface of a structure to be surveyed.

Referring now to FIG. 11, there is shown a similar embodiment in which the reference projection point beam sources for projecting reference points have been replaced by reference projection parallel line beam sources 21, 22 for projecting reference lines. A camera module 20 records the position of two parallel reference lines 24 and 25 projected onto the surface of a structure within the field of view 23 from two line beam generating laser sources 21, 22. The lasers have been adapted to produce lines through the use of a DOE, a Powel Lens or similar. The separation of the reference lines 24, 25 in the field of view 25 can be used to provide scale information and to determine distance to the target based on a prior knowledge of the system magnification, which is known for any given system. For the calculation, the actual distance between two points on the target must be known. In this example of FIG. 11, that is the distance between the pair of reference projection light source beams. Next the distance between the same two points in the captured image must be found. The difference between the real world distance and the image distance is due to the magnification inherent in the camera due to the focal length of the camera lens. Therefore the difference in distances corresponds to a particular distance from the lens. Thus with a suitable look-up table, the range to the target from the camera may be identified. Additionally, this range calculation can be carried out with just one of the laser lines shown in FIG. 11. In such a case, the laser line on the target is one point and the mid-point of the camera sensor is another. Therefore, the distance of the line from the centre of the image is compared to the distance of the beam from the centre of the camera.

Figure 12:
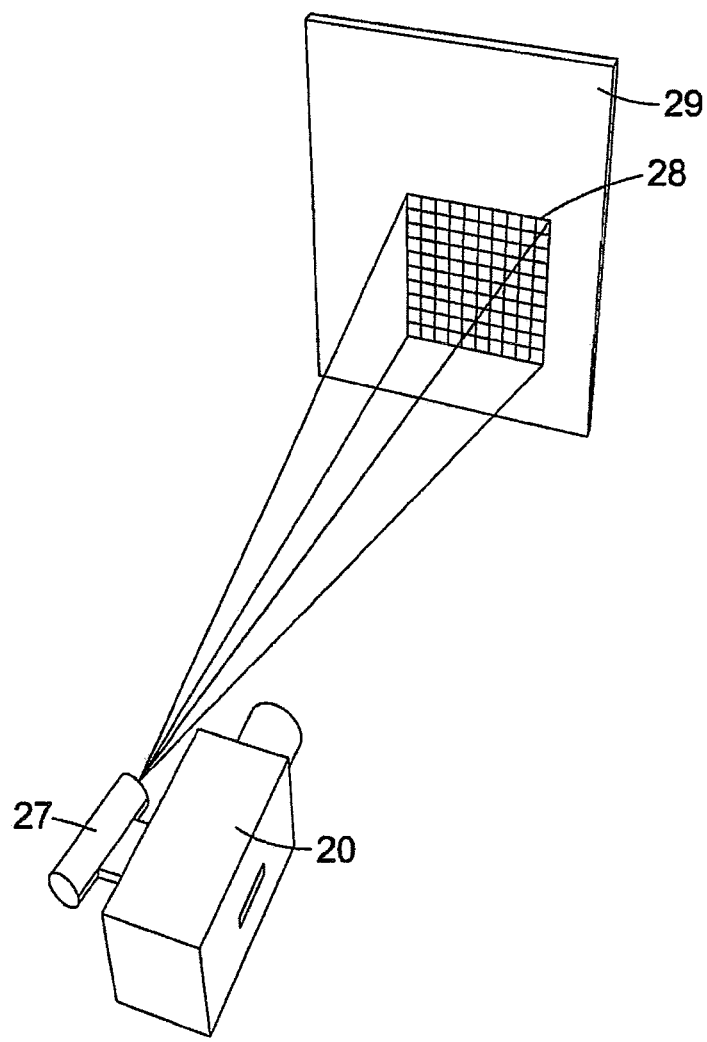
FIG. 12 is a diagrammatic representation of a system according to the invention to project a grid on the surface of a structure to be surveyed.

Referring now to FIG. 12, there is shown a further embodiment, comprising a camera module 30 and a reference projection light sources 31 adapted to generate a grid light beam. The camera module 30 records a scene 29 onto which is projected a grid 28 derived from the structured light source 31, in this case a laser source that has been integrated with a DOE. Range information and object pose is obtained from determining the relative sizes of various components of the grid which will distort in response to changes in the orientation of the structure and also of the surface topology.

Range information can be calculated from a determination of the size of the grid since the grid will expand angularly at a known rate with distance.

Pose refers to the location and orientation of an object in space. Depending on the orientation of the object, the grid with which it is illuminated may not appear to be purely Cartesian but rectilinear if, for example, the object is planer but oriented away from a plane normal to the camera angle and the structured light beams in question. The apparent scale change can be utilized to determine the orientation angle.

Figure 17:
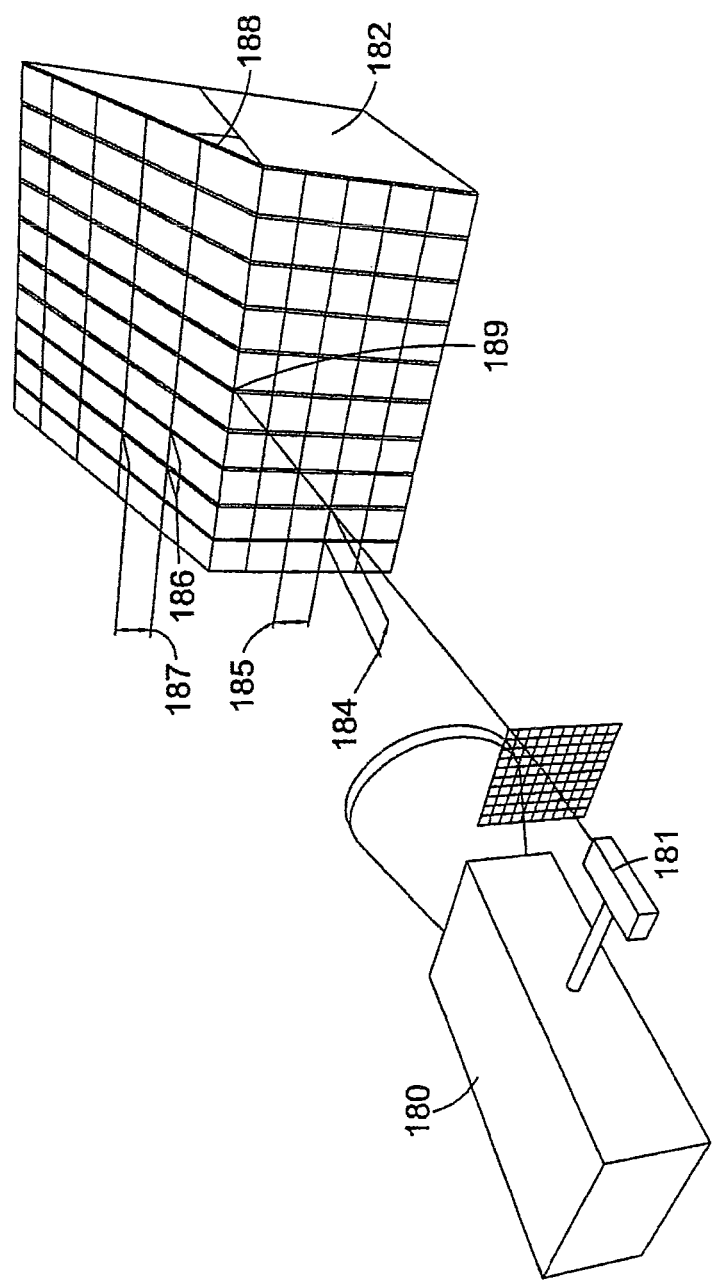
FIG. 17 is a is a diagrammatic representation of a system according to the invention to project a grid on the surface of a structure to be surveyed, showing a 3d structure.
Figure 18A:
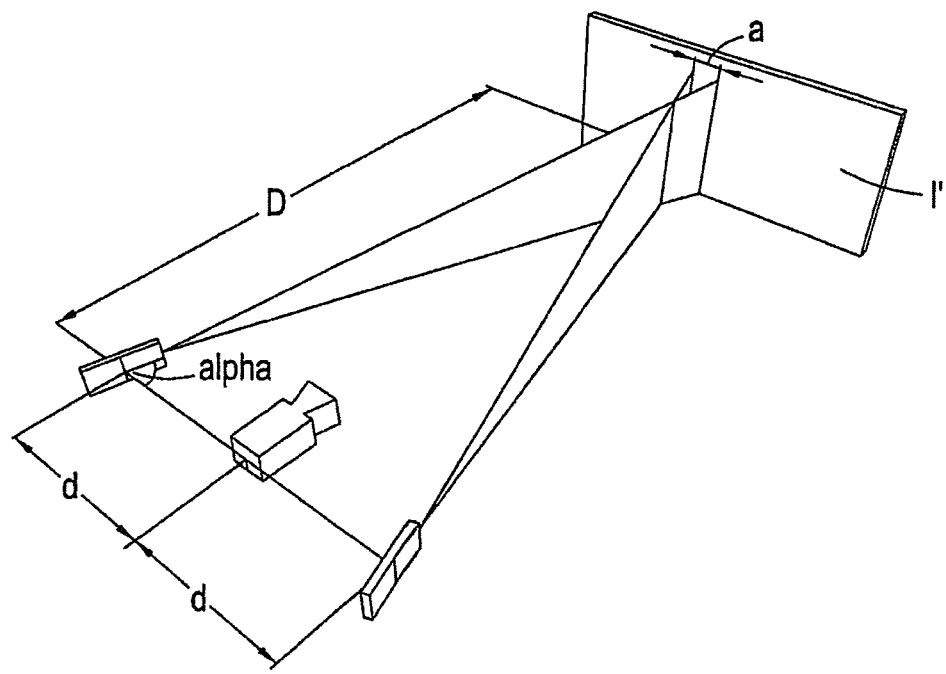
FIGS. 18(a), (b) and (c) are illustrations of a system according to the invention to calculate the distance to an object.
Figure 18B:
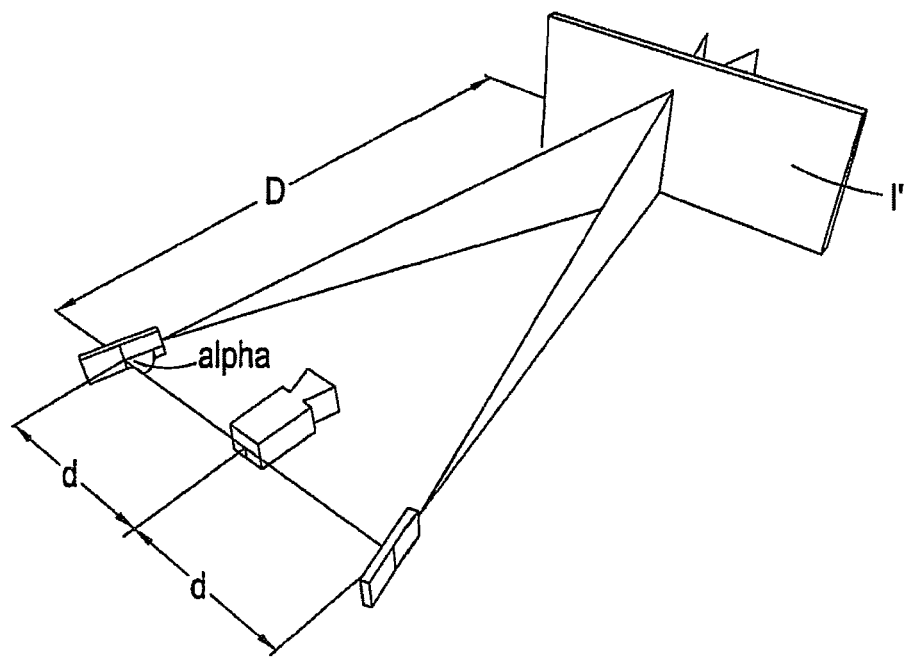
Figure 18C:
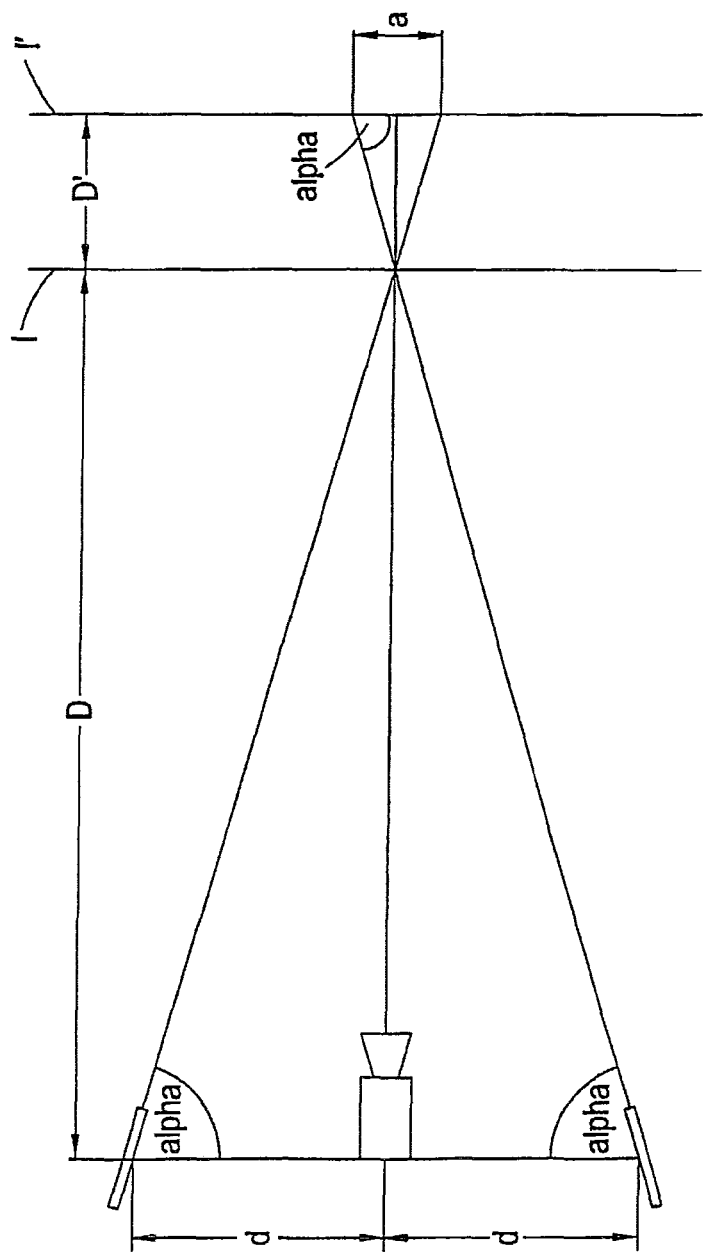
Figure 20:
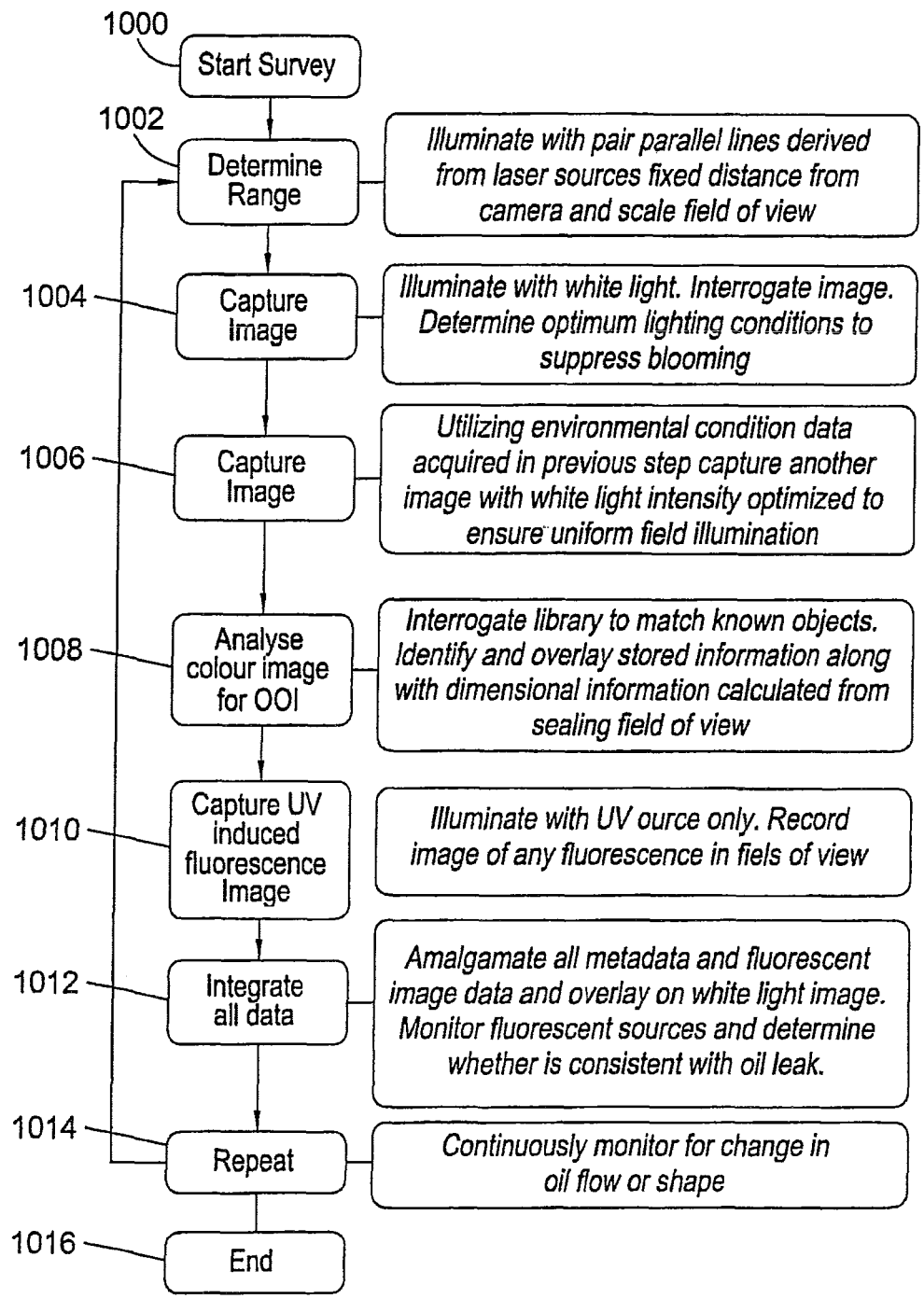
FIG. 20 is a flowchart providing an example of sequential imaging.

This is more clearly described in reference to the embodiment is shown in FIG. 17. A camera module 180 views an object 182 that is illuminated by a grid from a laser reference projection light source 181. The object 182 is, in this example, rhomboidal with a top surface that is oriented at an angle 188 to the horizontal. The appearance of the grid on the object 182 is determined by the pose of the objects surfaces to the grid illumination and the camera module. On those surfaces largely orthogonal to both the camera module 180 and the structured laser light source 181 the appearance of the grid components is Cartesian with component dimensions 184 and 185 apparently equal in length. On the inclined surface of the object 182 the component dimensions 186 and 187 are no longer equal and a calculation of their ratio enables the angle of orientation to be determined.

Figure 16:
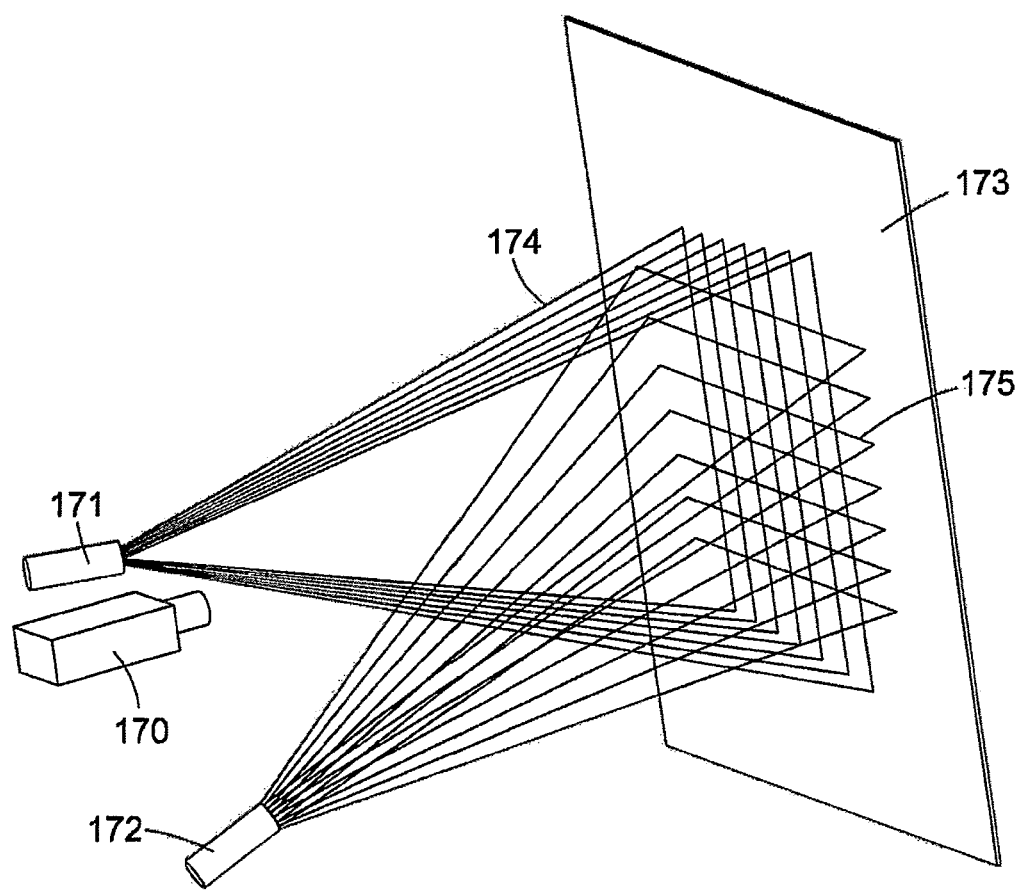
FIG. 16 is a diagrammatic representation of an alternative system according to the invention to project a grid on the surface of a structure to be surveyed.

An alternative grid beam embodiment is shown in FIG. 16. FIG. 16 shows a system comprising a camera module 70 and a pair of reference projection light sources 171, 172, each adapted to generate beams providing a set of spaced apart straight lines. Each of the reference projection light sources reference projection light sources 171, 172 is angularly offset from the camera orientation. The first reference projection light source 171 generates spaced apart vertical line beams, while the reference projection light source 172 generates spaced apart horizontal line beams. The beams generated by the reference projection light sources 171, 172 will therefore create a grid when they overlap each other. The spacing between the lines in each beam will depend on their distance from the reference projection light sources 171, 712.

Figure 13:
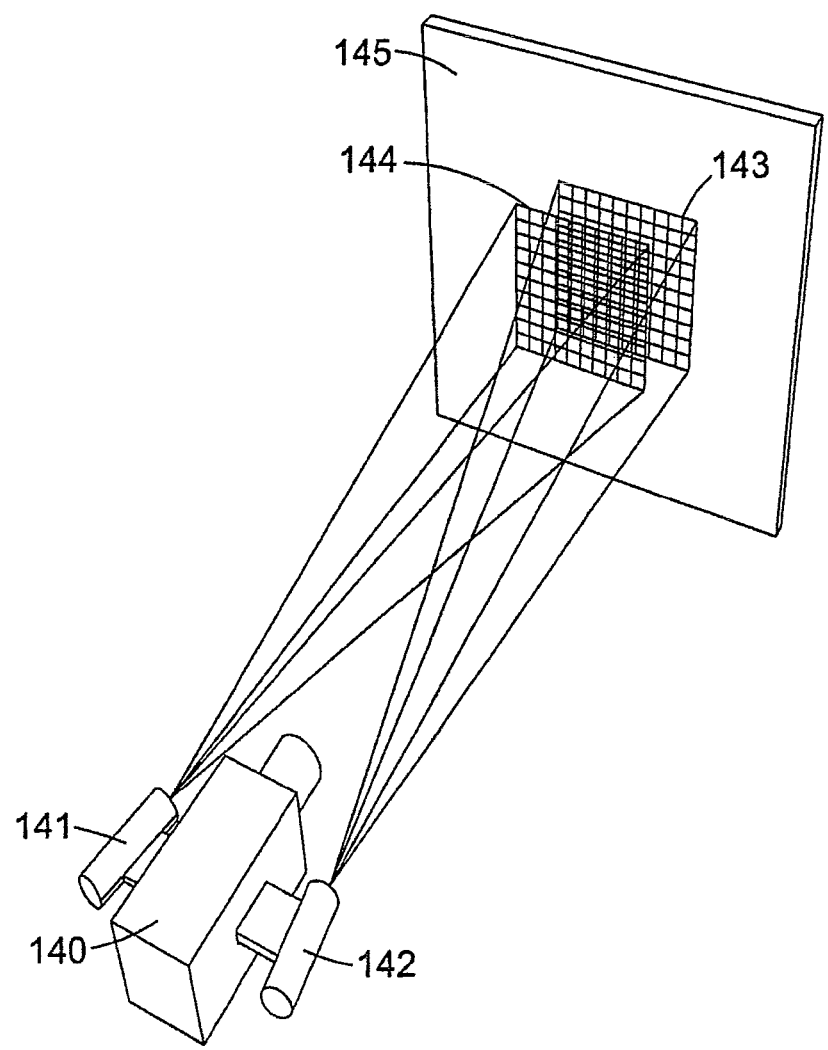
FIG. 13 is a diagrammatic representation of a system according to the invention to project a pair of grids on the surface of a structure to be surveyed.

Referring now to FIG. 13, there is shown a camera module 140 fitted with a pair of grid-projecting reference projection light sources 141, 142 that produce grids 143, 144 on the surface of an object in the field of view 145. In this way, shadowing information can be obtained, based on distortions associated with the overlapping grids. This enables 3D information on the object to be obtained. Where aspects of an object under survey contain features that protrude and obscure the view of other aspects of the object from a particular line of sight, a shadow is present. Using alternate viewpoints allows the shadowed region of the object to be viewed and the use of grids to illuminate an object from differing viewpoints enables the dimensions of the shadowed regions and those regions casting the shadows to be determined.

Figure 14:
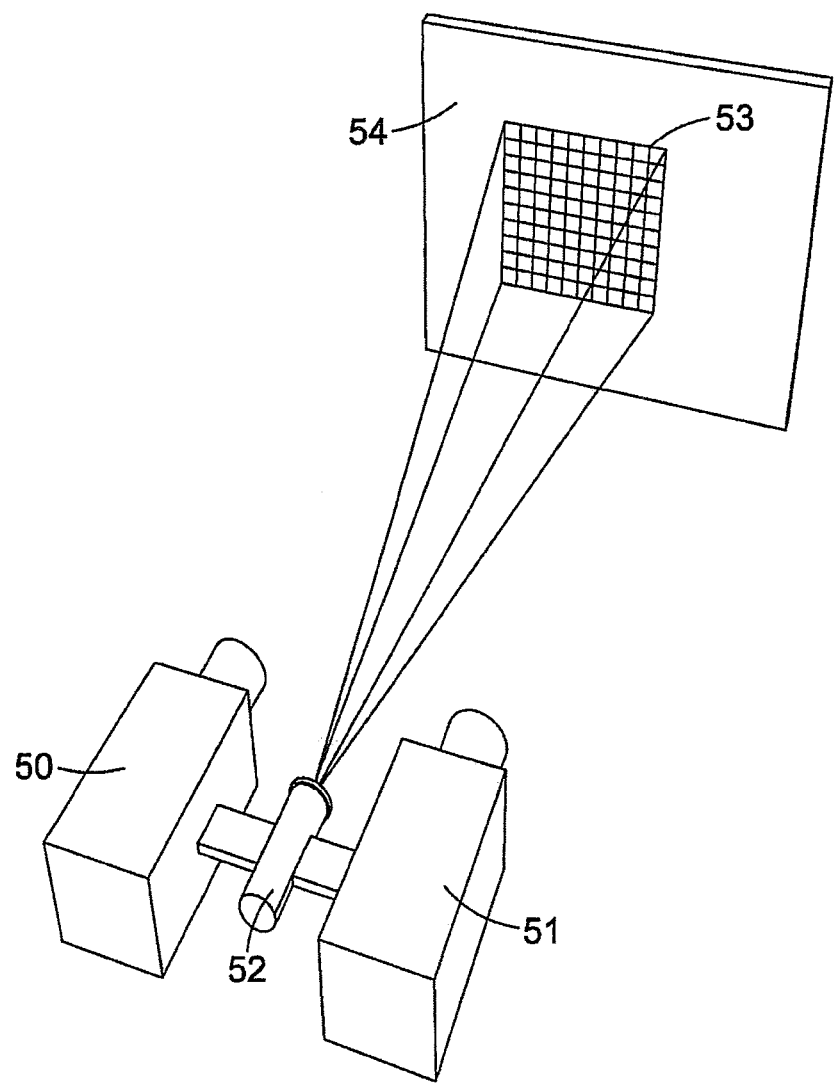
FIG. 14 is a diagrammatic representation of a system according to the invention to project a grid on the surface of a structure to be surveyed by stereo imaging.

Referring now to FIG. 14, there is shown a stereo-imaging system comprising a pair of spaced apart cameras 50, 51 having a grid-projecting reference projection light sources 52 located equidistant between them. The cameras 50, 51 record a field of view 54 with a grid 53 superimposed on i.e. synthesis of the two resulting images through software then allows a 3D reconstruction of the scene. Furthermore, for dual camera and laser line, grid or structured light patterns within a sequential imaging system, 3D reconstruction and recalibration of lens focus, magnification and angle is possible.

Figure 15:
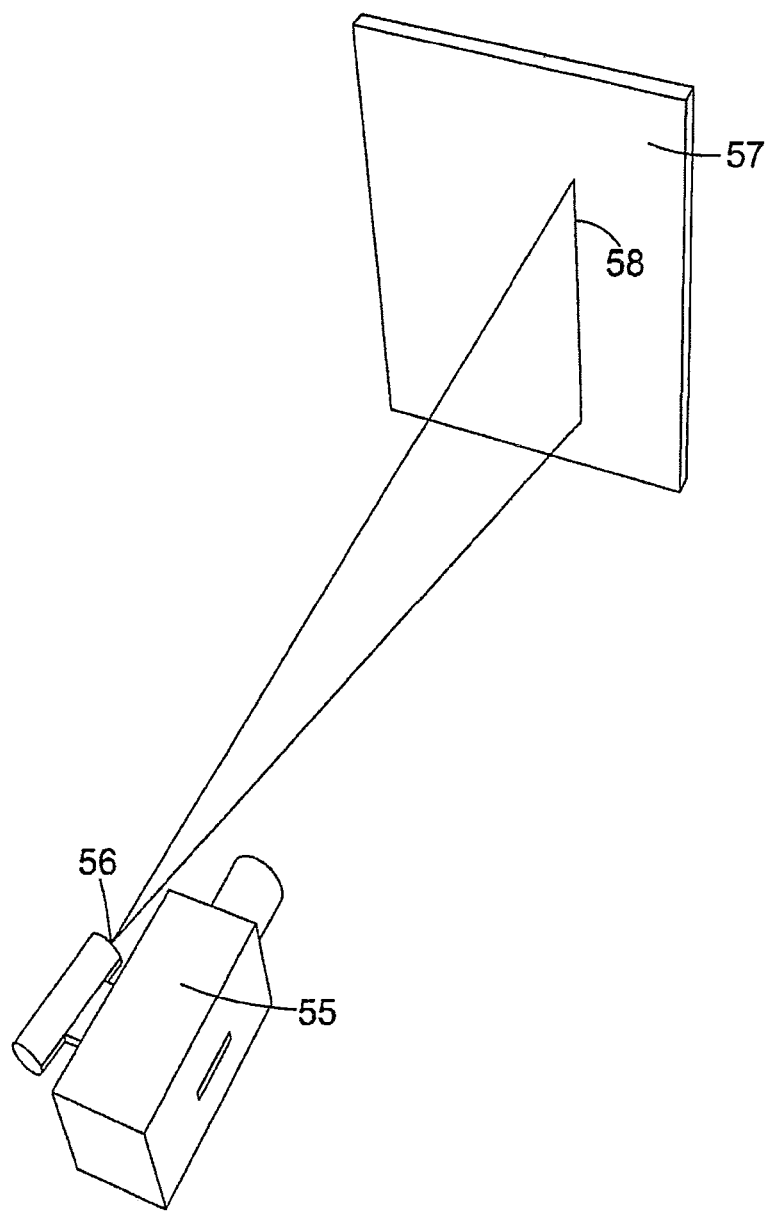
FIG. 15 is a diagrammatic representation of a system according to the invention to project a line for scanning across a scene.

In an additional embodiment a single line structured beam such as in FIG. 15 can be used to generate a 3D image of an area under survey. By progressively moving the laser line along an area or object to be surveyed, and capturing an image of each or many positions of the laser line, all of the captured images may be combined to create a 3D representation of the surveyed area or object. The 3D representation may be overlaid on a white light image, or other image, of the scene to form an augmented output image according to embodiments of the invention. This particular embodiment of the sequential imaging method of the invention is particularly useful if operated at very high frame rates, for example 200-300 frames per second, such that many laser line images can be captured without much movement of the survey vehicle. Such a 3D laser line composite image can be useful for highlighting undesirable ovality in a pipeline, dents or other out-of circularity defects in the shape of the pipeline.

In an alternative configuration a single-line scan camera can be used instead of an area scan matrix camera to only capture the region of the scene illuminated by the line. In this configuration image acquisition is extremely rapid and permits arbitrarily long frame lengths to be captured and stored while also facilitating the use of Time Domain Integration techniques to increase the sensitivity of the detection process and compensate for low light levels.

Referring now to FIGS. 17(*a*), (*b*) and (*c*), there are provided illustrations of the use of trigonometry and non-parallel structured light beams for calculating range. This method relies on using two line reference projection light sources equally displaced either side of a camera at a distance (d). The greater the distance between the line generators and the camera module the more accurate the technique is. The line sources are also positioned at an angular offset (alpha) to each camera module. For illustrative purposes assume the image plane is flat and orthogonal to the central axes of the camera module. The line generators produce 2 parallel lines in the image plane. At some distance D from the camera module the 2 parallel lines will overlap in image plane I'. This distance may be calculated from $$D = d\ \tan(\text{alpha})$$

Hence the range to an object where the two lines overlap may be determined.

In situations where the object lies in image plane I' the object is an additional distance D' beyond the plane where the two lines overlap and an observer in this case observes two discrete parallel lines separated by a distance (a), which can be determined if the Field of View (FOV) size of the camera module is known. Knowing the magnitude of (a) then enables the determination of D' through the relation:

$$D' = (a/2) \times \tan(\text{alpha})$$

And hence the total range to the object is D+D'.

For example the line sources may each be separated from the centre of the camera module apparatus by 1 m and the angle between each source and the camera module apparatus may be 2°. In this case both lines will overlap within the field of view of the camera module at a distance of 28.6 m. Should the lines be determined to be 1.8 m apart the distance to the camera module will be 11.5 m.

The use of reference projection light source can also be used to determine the attitude of the survey vehicle, that is the plane of the vehicle relative to the seabed, or other fixed object below it. By analysing two laser lines, one at the front and one at the back of the survey vehicle, it is possible to deduce the attitude using trigonometric calculations based on the length of the lines. As the vehicle changes attitude, the distance between the lines will also change, and as the actual distance between the lines, we can calculate the attitude.

In these instances it will be recognised that that the projection laser sources need not be identical in colour or power and may be modulated to best match the environmental conditions. For example a scene such as in FIG. 9 may be being surveyed for example with illumination from a white light, or with sequential illumination from red, green and blue semiconductor light sources which are strobed on and off and matched with the exposure time of the camera module so as to acquire three monochromatic images which can then be combined to produce a faithful colour image. The reference projection laser source can then be turned on while the other light classes are off and an image acquired of the position of the references within the field of view. Processing of this image in software provides scale information for the main which may be utilised to generate dimensional data for objects recorded in the field of view.

The laser source for one of the reference points of FIG. 9 may be red in colour while the other could be blue, allowing range information to be estimated based on the relative transmissions of both colours in the aquatic environment and the initial power of each source.

Having the means to acquire the raw data of an underwater survey is but one component of the operation. In gathering the survey data, the scale and dimensional information, acquired as described herein in relation in FIGS. 9 to 18, are recorded alongside the image data. Software processing of the image and scale data can take place in real time and the live video stream may be overlaid with information regarding the range to the objects within the field of view and their dimensions. In particular the 3D data that is acquired can be made available to the viewer as metadata and overlaid on the survey stream by the control software that can identify features of interest within the image stream based on a known library.

In addition other arrangements of the reference beams can be suggested whereby both scale and range may be determined such as an embodiment where two parallel line sources are used in conjunction with a fixed offset angle source. The parallel sources can be used to determine range from measurement of the linear offset of either or both of the parallel reference beams and knowing the angular offset In another embodiment the range information obtained can be utilized to ensure that variable focus imaging systems produce sharp images which avoids the issues associated with the lack of contrast in many underwater scenes.

Camera Parameters

According to further aspects of the invention, in addition to changing lighting parameters between individual frame acquisitions, the following parameters of the camera module can be changed between frame acquisitions: frame rate, frame synchronization, exposure time, image gain, and effective sensor size. In addition, sets of images can be acquired of a particular scene. The sets may include a set of final images, or a set of initial images that are then combined to make one or more final images. Digital image processing may be performed on any of the images to enhance or identify feature. The digital image processing may be performed by an image processing module, which may be located in the control module or externally.

Frame rate: The number of frames acquired in one second. The present invention, through adjustable camera control parameters, allows a variable frame rate; enables synchronization based on an external clock; and allows an external event to trigger a frame acquisition sequence.

Exposure time: The method of the invention allows for the acquisition of multiple images, not only under different illumination conditions but also under varying pre-programmed or dynamically controlled camera exposure times. For sensing specific defects or locations, the capability to lengthen the exposure time on, for example, the red channel of a multiple colour sequence, has the effect of increasing the amount of red light captured and therefore the range of colour imaging that includes red. Combined with an increase in red light output power, and coupled with the use of higher gain, the effective range for colour imaging can be augmented significantly.

Gain: Optimization of the gain on each colour channel provides an added layer of control to complement that of the exposure time. Like exposure time, amplifying the signal received for a particular image and providing the capability to detect specific objects in the image providing this signal, allows further optimization and noise reduction as a part of the closed loop control system in FIG. 9 for example.

Effective sensor size: Since the invention provides a means to acquire full colour images without the need for a dedicated colour sensor, the available image resolution is maximized since colour sensors either require a Bayer filter, which necessarily results in pixel interpolation and hence loss of resolution, or else utilize three separate sensors within the same housing in a 3CCD configuration. Such a configuration will have a significantly higher power consumption and size than its monochrome counterpart.

The higher resolution available with monochrome sensors supports the potential use of frame cropping and binning of pixels since all of the available resolution may not be required for particular scenes and magnifications. Such activities can provide augmented opportunities for image processing efficiencies leading to reduced data transfer requirements and lower power consumption without any significant impairment to image fidelity.

Low light, cooled and specialist "navigation cameras" such as Silicon Intensifier tubes and vidicons or their equivalent CMOS, sCMOS, EMCCD, ICCD or CCD counterparts are all monochrome cameras and this invention and the control techniques and technologies described herein will allow these cameras to be used for full colour imaging through acquisition of multiple images separated by short time intervals, similar to the scenario depicted in FIG. 7.

RGBU sensing: Adding an additional wavelength of light to the combination of red, green and blue described previously allows further analysis of ancillary effects. Specific defects may have certain colour patterns such as rust, which is red or brown; or oil, which is black on a non-black background. Using a specific colour of light to identify these sources of fouling adds significant sensing capability to the imaging system.

A further extension of this system is the detection of fluorescence from bio-fouled articles or from oil or other hydrocarbon particles in water. The low absorption in the near UV and blue region of the water absorption spectrum makes it practical to use blue lasers for fluorescence excitation. Subsequent emission or scattering spectra may be captured by a monochromator, recorded, and compared against reference spectra for the identification of known fouling agents or chemicals.

RGBRange Sensing: Using a range check, the distance to an object under survey can be accurately measured. This will enable the colour balancing of the RGB image and hence augmented detection of rust and other coloured components of a scene.

RGBU: A combination of white light and structural light, where structural light sources using Diffractive Optical Elements (DOEs) can generate grids of lines or spots provide a reference frame with which machine vision systems can make measurements. Such reference frames can be configured to allow ranging measurements to be made and to map the surface and height profiles of objects of interest within the scene being observed. The combination of rapid image acquisition and the control of the lighting and structured light reference grid, as facilitated by the invention, ensure that the data can be interpreted by the control system to provide dimensional information as an overlay on the images either in real time or when the recorded data is viewed later.

Sonar

Sonar is a well-known technique for sub-sea bathymetry, and it can be very useful in detecting the location or presence of a pipeline or other underwater structure. However, it is does not provide sufficient detail to carry out a full survey. However, in certain embodiments an underwater survey vehicle may comprise a sonar module that works in conjunction with the sequential imaging module. In this way, sonar images of a scene may be included in an augmented output image resulting from the sequential imaging.

Additionally, a sonar map or image of an installation to be surveyed can be a useful part of presenting survey data. The sonar map be linked to augmented output images based on their location tags, such that the sonar map may be used by a user to navigate to a chosen point of the survey and view the augmented output images associated with that location.

EXAMPLES

One of the simplest embodiments of the present invention is to capture a white light image of a scene and a pair of laser lines image of that same scene. The laser lines image can be used to provide range and dimension information for the white light image, such as the distance to objects in the image and sizes of those objects. This information can be overlaid on the white light image, or otherwise included as metadata with the image to form the augmented output image. It is also possible to carry out edge detection on the white light image, and highlight any edges found in the white light image. In this example, the whole white light image is included in the augmented output image, the range and dimensioning are aspects derived from the laser lines image, and any highlighted edges or info derived therefrom are aspects derived from the white light image. Certain information would be derived from a combination of the white light image and the laser lines image, for example the width of a pipeline. The presence of the pipeline is derived from the edge detection of the white light image, and the dimension of that pipeline comes from the laser lines image.

Using white light and a pair of laser lines for attitude determination and a laser lines for 3D laser triangulation is another example of the present invention.

Using lights of two different colours can be used to highlight particular features.

As discussed using white light and UV light can be used to detect hydrocarbons and other fluorescent materials.

While the methods and systems described herein are aimed primarily for use in underwater survey vehicles, such as ROVs and AUVs, and stationary sub-sea sentry systems, it may also be used, on a suitably sized support vehicle, to perform a survey inside a pipeline, flow line or the like. It is known to flush such vessels with a bolus of water as part of maintenance action known as 'pigging". By loading a submersible module adapted to comprise the systems described herein or to use the methods described herein into the bolus of water, a survey of the inside of the pipe may be carried out as the water and submersible module move through the pipe. Such an internal pipe survey would comprise AUV type operation, that it without a tether. Similarly, the methods and systems described herein may be used for downhole imaging and measurement. A downhole survey would be operated with a submersible module attached to a tether such that some or all of the survey data could be transmitted back to the surface as the survey was carried out.

It is an object of embodiments of the present invention to improve subsea image quality and video quality, in underwater imaging systems, particularly for use with for submersible remote controlled vehicles. In certain embodiments, improved colour representation is achieved. It is a further object to improve the effective resolution of cameras and sensors used to gather images underwater by eliminating or compensating for effects which reduce the quality of information received by individual pixels or arrays of pixels that form the images. It is a further object to improve analysis of the captured images by providing lighting and camera conditions that highlight certain features.

It will be understood by the person skilled in the art that the methods, techniques and systems described herein can be used in all underwater imaging platforms, whether fixed or mobile, including sleds, hybrid vehicles and semi-autonomous submersible vehicles. When operating on an ROV, or other platform similarly connected via a tether to a surface control station, a video output of augmented output images is provided, in substantially real time. This video output may be provided in tandem with a raw video feed of white light images. In such case, the main processing is carried out at surface control station. As the processing power is not limited by the size or power supply to the ROV, a video output with only a 2 or 3 frame delay may be provided. For AUV based systems, real time output is not required. Furthermore AUV systems would not, with current technologies, have sufficient processing power to provide the real time analysis. The augmented output images resulting from an ROV survey and an AUV survey are of substantially the same quality and comprise the same augmentation features.

For an autonomous vehicle, there is no pilot so if visibility is poor, or if objects in the scene are out of focus, and the system is not aware of this, then the AUV may return with no reliable image data. Such data cannot be greatly improved in post processing. It will be understood by the person skilled in the art that the present invention can improve image quality and optimize imaging parameters for autonomous vehicle image acquisition by way of closed loop, autonomous image control. It will be further understood that the control scheme proposed herein can provide data to the vehicle subsystems to enable image acquisition decision making and to provide information, based on these images, to other subsystems autonomous vehicles, for example navigation. For example, consider a situation where the standard operating instructions for the AUV survey was to capture a white light image, structured light images for deriving range and dimensions; and a UV image to check for fluorescence, which may indicate the presence of hydrocarbons. However, fluorescence may also be caused by other organic materials. If fluorescence is detected thought analysis of the UV image, the AUV will automatically switch to full characterisation mode to capture additional images of the area in question, so as to be able to determine if hydrocarbons have actually been detected, and the likelihood that those hydrocarbons are the result of a leak. Full characterisation mode comprises capturing further UV images to detect changes in the profile of the fluorescence. This will provide information on whether the fluorescent anomaly is moving, and if so how hast. Additionally, additional white light images and laser structured light images will be captured. Analysis of the associated white light images provides information assisting in decided if the anomaly is a leak, for example, if there is fluorescence near the joint in a pipeline, shown in the white light image, then the probability that the fluorescence is a leak is high. On the other hand, if the white light image shows jellyfish only distant manmade objects, the probability is that it is not a pipeline leak.

These techniques may also be applied to other issues or defects, for example, rust detection, crack detection, free-spanning detection. Free-spanning refers to a situation where a pipe has been laid on the sea but subsequently the sand underlying the pipe has been eroded away such that sections of the pipe are no longer supported by the seabed, and are at risk of buckling. Free-spanning detection is carried out by comparing the range to the pipeline itself and the range to the seabed on either side thereof. If the difference is out of specification, then free-spanning may have occurred. The closed-loop control process triggered by possible free-spanning comprises capturing many laser range images measuring distance to the pipeline and distance to the seabed along the pipeline. This allows the severity and beginning and end of the free-span.

A further example of the closed loop control functionality may be useful is where there is floating "debris" in a scene. Such debris can prevent reliable measurement within a scene. Where moving debris, fish or objects are detected in a scene, the system can be directed to acquire an additional scene soon after. Moving objects can be identified and quantified by the image processing function through machine vision techniques. In this situation the closed loop control may switch to a high frame rate or multiple light conditions mode to reduce the effect of backscatter but also to acquire data form images with frequency filtering to remove the particles. The output of multiple images is augmented by adding the background information from another image so as to minimize the impact of particles.

Additionally, the closed loop control functionality may provide navigation instructions such that the AUV may be directed to adjust its position relative to the pipeline, so as to characterize the defect form another viewpoint.

The closed loop control implemented as part of certain embodiments of the invention is illustrated in FIG. 19. Initially, the quality of a captured image is checked. This is done by attempting an edge detection operation on a white light image. Additionally, a laser line image is captured and analysed. If the edge or a laser line are detected, the camera or lighting parameters are automatically adjusted to enhance the detected edge, and so allow a better quality image to be captured. Power, polarisation, angle, colour, wavelength are examples of lighting parameters that could be changed in response to camera feedback to the system. Similarly, camera exposure time and number of frames could also be varied.

Once good images for an augmented output image are captured, they are analysed for certain objects or defects. If there is an indication that a certain object or defect is present, the system is instructed to capture additional images with different lighting and/or camera parameters so as to capture images that will allow a more accurate identification of the relevant fault or object.

Another example of this closed-loop control is the increase of dynamic range in an augmented output image. For example, if it is detected that areas of a captured image have high brightness, it will capture a further images of that field of view with a reduced exposure so as to allow finer detail to be observed. Dynamic range can also be improved by adjusting the lighting conditions in subsequent image captures, for example, the power, angle polarisation, UV and so on. By adding these sequentially captured images together, an augmented on very high dynamic range can be achieved.

FIG. 21 shows a flow chart of an exemplary method of the overall system in which the present invention operates. In step 1000, the survey commences. In step 1002, information on the range of the survey vehicle to the object to be surveyed. This comprises capturing an image from a reference projection light source and carrying out measurements thereon. In step 1004, an image of the object is captured under white light illumination, according to one set of camera and light control parameters.

The image is analysed to identify any quality issues, and new camera and control parameters are calculated to overcome the issues. During the survey, the system continuously interrogates the local environment to determine the optimum exposure time and LED or laser power to use to illuminate the scene under survey ensuring the highest quality images are obtained. Range data can similarly be recorded and overlaid on each image, using for example the fixed offset parallel line method. This range data can then be used to maintain a fixed distance from the an object to be surveyed or used to control the illumination levels or exposure times to ensure that each image has similar lighting conditions thus allowing easier comparisons between images.

In step 1006, a second image is captured using the new control parameters, for example using environmental condition data acquired in step 1004 to capture another image with the white light intensity optimized to ensure uniform field illumination.

In step 1008, the captured image is analysed using machine vision techniques to identify objects in the image. Edge detection and body detection are used to identify objects, which may then be compared with a library of objects known to be present.

In step 1010, a further image of the scene is captured, this time using only UV illumination such that the camera captures an image of the resulting fluorescence. This is useful for identifying any hydrocarbons, for example resulting from oil or gas leaks or from biofouling.

In step 1012, all useful image data and metadata is amalgamated and the individual images are concatenated into a single composite augmented output image, by overlaying on the good quality image resulting from the adjusted white light illumination. For certain objects, a library image of that object, such as a CAD file, may be included in the augmented output image. Additionally, an image of that object from a previous survey may be included in the augmented output image.

In step 1014, the steps of the method are repeated for the next field of view of the camera. In step 2016, the survey is completed and the information is stored for future reference.

Data Management

Embodiments described herein include a method to improve data management and to reduce the data storage requirements of underwater surveying technology, even at high resolution and that also facilitates more efficient analysis of underwater scenes for data extraction.

In viewing underwater video survey information obtained via prior art methods, an observer is generally limited to view the data at the rate that it was acquired. Typically this is 50-60 Hz, or 50-60 frames per second, for progressive scan or interlaced video. For the example of inspecting a pipeline, a survey vehicle would move alongside the pipeline and record continuously, taking in an area, depending on the camera lenses, of several square meters in any one frame. The area captured in one frame is referred to as the field of view. At a typical velocity of 1 m/s, this ensures that only a fraction of the field of view changes within 1 second and that several seconds would be required before an entirely new field of view were recorded. Thus a video survey could contain a high percentage of frames which do not differ in any appreciable way, such that there is significant data redundancy in the video stream.

Once the survey has been completed and the survey vehicle has returned to its surface control station, such as a survey ship or a drilling platform, it is necessary to review the survey results. Reviewing each augmented output image generated in the course of the survey may not be the most efficient use of a person's time, particularly if they are only looking to review the results in relation to a certain area, defect, object or object class. Therefore an alternative reviewing option is described herein in the form of a composite image that takes advantage of the high degree of overlap and data redundancy across neighbouring augmented output images. The composite image is formed by concatenating the scene images of neighbouring augmented output images, thus eliminating a number of redundant intervening images.

Additionally, once the survey is completed, all the survey data is available at the surface control station, however, it may be necessary for the survey results to be transmitted ashore for further analysis. Transmitting data from a ship or platform is typically carried out by satellite, which can be very expensive for large amounts of data. Therefore steps for reducing the amount of data to be transmitted described herein. These steps include reducing the number of augmented output images transmitted, based on the redundancy provided by the large overlap in information between adjacent augmented output images. For a video stream of augmented output images captured a 24 fps, to reduce the sequence to be transmitted to equivalent to 2 fps for 3 fps.

Furthermore, in any augmented output image, much of the image is background information and not relevant to the survey results. Therefore by performing object extraction on any object identified in the augmented output image, it is possible to extract the important image data from an augmented output image and simply transmit that, further reducing the data to be transmitted. The extracted object would be accompanied by the relevant metadata for the augmented output image including telemetry and location data, as well as the object's location within frame. Typically, vehicle position and location of objects within frame is sufficient to uniquely identify any component. The extracted object can then be overlaid on a previous survey image, CAD file, sonar image of the site, library image or the like to provide context when being reviewed.

Additionally, for some particular types of survey, certain key information is more important, for example for a pipeline survey, the precise position of the pipeline is required. Thus it is possible to provide the required data by extracting edge and centreline information from the augmented output image. The edge information for a series of augmented output images may be transmitted easily. Again the edge data is transmitted with metadata including vehicle position data and data to locate the edge within the frame.

Moreover, if survey results from a previous survey are available, it is possible to perform a comparison, such as by subtraction, to identify change data. As such, it is possible to transmit only the change data, with vehicle position, location within frame and other metadata. On receipt, the change data can be overlaid a previous survey image, CAD file, sonar image of the site, library image or the like.

In a static or slow moving environment, full frame video is not necessary to provide a complete and viable record for useful analysis. Embodiments of a method described herein provide an alternative to conventional video review of the survey by generating a composite still image through which the user can navigate to his area of interest, and at any point access the accurate augmented output images associated with that point. Typically, the composite image is of lower resolution than the augmented output images or the scene images.

A sonar image of the survey area, such as that generated by side-scan sonar, may also be used to provide an overview of a survey area. The sonar image can be linked to the augmented output images from the survey. In this way, the user would navigate through the sonar image to the region of interest and then view the augmented output image associated therewith. In an embodiment where the underwater imaging system comprises a sonar module, the sonar image could be based on sonar images gathered to contribute to the augmented output image.

As discussed previously, an ROV, with sufficient processing power at its surface control station can provide a 24 fps augmented video stream in substantially real-time. Similarly, an AUV, which does not need to provide a real-time output, will capture a relatively high number of frames per second, even though the frame rate may not be high enough to provide a user-friendly video stream. However, given the slow pace of the survey vehicles along the survey path, the fields of view captured will have a significant overlap with adjacent fields of view. Therefore it is possible to allow an AUV to have a much lower frame rate and still capture sufficient survey data.

By defining the desired overlap, for example 10%, and ascertaining the speed the survey vehicle is travelling, it is possible to calculate a suitable frame rate to capture a complete survey image of the scene in question. Given the large amount of data gathered for a video stream, and difficulties end costs associated with transmitting that data from a surface survey ship, it is preferable to have a way of reducing the amount of data required to provide an accurate representation of the survey results. This data reduction can be achieved in a number of ways. Firstly, storage efficiencies can be garnered from only storing the minimum sufficient augmented output images to provide a complete record of the structure or scene under survey. In this regard, as mentioned previously, knowledge of the velocity of the survey vehicle and the camera optics and field of view can be used to determine the time interval between the capture of images or the distance spacing to ensure either capture adjacent image with sufficient overlap to ensure continuity. This can be better seen with reference to FIG. 21 where a single augmented output image 410 is shown which represents the capture of a single field of view of the camera. Two augmented output images representing contiguous fields of view are shown by 411 and 412, where the fields of view just abut each other and represent the best case for minimum storage requirements for maximum scene capture. However, in practice there will always be some uncertainty in vehicle position or timing such that overlaps are mandated, for example the overlap 415 between the adjacent augmented output images 413 and 414, shown in FIG. 22(a). As a survey vehicle moves along a structure or through a scene, a large number of such augmented output images are captured sequentially and a subset of three adjacent fields of view are shown where frames 416, 417 and 418 overlap in regions 419 and 420.

The images may be joined together by identifying features in one augmented output image and matching that feature to a similar feature in a suitable location in another augmented output image, using standard correlation algorithms. Often matching features in one scene image to those of another requires modification of one of both scene images.

It will be understood that the survey vehicle need not only move in a single direction or be constrained to a single camera or a single orientation of a single camera but can also move in other directions or have multiple cameras oriented to provide captures of other fields of view which may be above and or below the main field of view, or may be able to re-orient its camera to enable adjacent or contiguous fields of view be captured as with the two dimensional grid composite images shown in FIGS. 21(b) and 22(b). Furthermore, in a case of more than one camera being used, the field of view of one camera may be different to the field of view of another camera, leading to the resulting composite image being formed from fields of view of non-uniform sizes.

Each augmented output image is derived from at least one scene image, that is, an image that provides a good visual representation of the field of view, for example a white light image. Laser line images or UV images would not be considered scene images as they do not represent a reasonably detailed view of the scene in question. A scene image gives a user a good idea of what is in the field of view.

In order to provide a useful viewing tool for non-video frame rate survey results, the method provides generating a composite image from the captured images. The composite image takes the form of a single large image file. In general, the augmented output images or underlying scene images do not fit together easily to provide a cohesive user-friendly composite image. This is due to a number of factors including the fat that the lens is not telecentric, and the perspective view changes between augmented output images. However, since the aim of the composite image is to provide a useful data review and navigation tool for a user, it is not necessary to provide a composite image that preserves accuracy in the augmented output images. It is therefore useful to modify the scene images when forming the composite image.

Generating the user-friendly composite image requires that the images be modified to ensure alignment, which results in a loss of accuracy in the composite image. The augmented output images provided by the method and system described herein are accurate images from which measurements and scale data can be taken. Possible modifications include changing the resolution of the scene image, typically lowering it; adjusting the scale of the scene image; adjusting the pin-cushion or barrel distortion of the scene image and so on.

The composite image may be formed as a one dimensional concatenation of scene images i.e. in a linear manner, similar to a film strip. This is particularly suitable for survey of a cable, pipeline or the like lying on the seabed, or a vertical riser. Alternatively, the composite image may be formed in a two dimensional manner, i.e. as a grid, which may be more useful for representing large areas.

When viewing the survey results using the composite image, the user is able to do so as per any digital image file, having a region of interest that is displayed on his screen. By zooming in, or otherwise selecting a detailed view of a specific area, the user accesses the augmented output image associated with the chosen region of interest.

Figure 23:
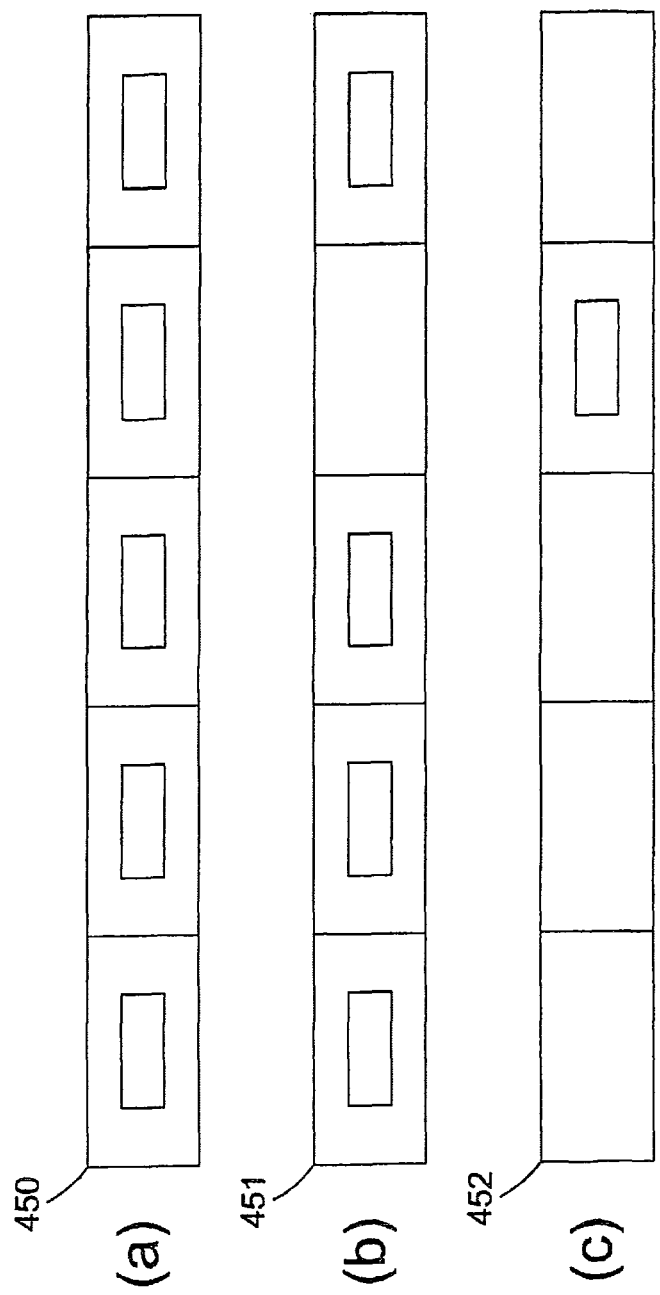
FIGS. 23(a), (b) and (c) are diagrammatic representations of a first linear composite survey image, a later linear composite survey image of the same field of view and a comparison thereof respectively.

Referring now to FIG. 23(a), there is shown a representation of a first linear survey result comprising a sequence 450 of augmented output images. In FIG. 23(b) there is shown a second linear survey result comprising a sequence 451 of augmented output images, corresponding to the results of a second survey carried out on the same scene at some time after the first survey. Therefore, by processing the corresponding sets of augmented output images to subtracting the first survey result from the other, any differences that have developed between the surveys can be easily identified. Such changes may indicate the development of a rust patch, or an area of biofouling. FIG. 23(c) shows the result of a subtraction comparison between the first sequence 450 and the second sequence 451. For ease of analysis by the user, the comparison may be performed automatically and any disparities may be overlaid or highlighted on the second composite image as it is reviewed by the user. This feature facilitates the examination for comparison purposes of surveys of the same scenes or structures conducted at different times. This feature may be particularly useful in industries where it is common for surveys of certain infrastructure to be conducted on a regular basis such as daily or weekly.

Additionally, when transmitting the survey results from the surface control station, it may be sufficient to transmit only the result of the subtraction as shown in FIG. 5(c), thus greatly reducing the data to be sent.

The method of determining the differences between the surveys will utilize machine vision techniques including object detection, pattern matching and identification algorithms where the composite image as a whole is processed.

The objects of interest in the images resulting from a survey may represent less than 1% of all the area surveyed. Through recording of telemetry data with the object, provided the telemetry data is at least as accurate as the image area over a number of linked frames (for example, 3 m) objects can be associated with the object found in a previous survey. These points require only the relevant position or telemetry data. The same object data or potentially only the change data needs to be presented. There are two aspects, the real time processing of data is dependent on processing power, however, once processed, the review and comparison stage requires only the result to be compared.

Figure 24:
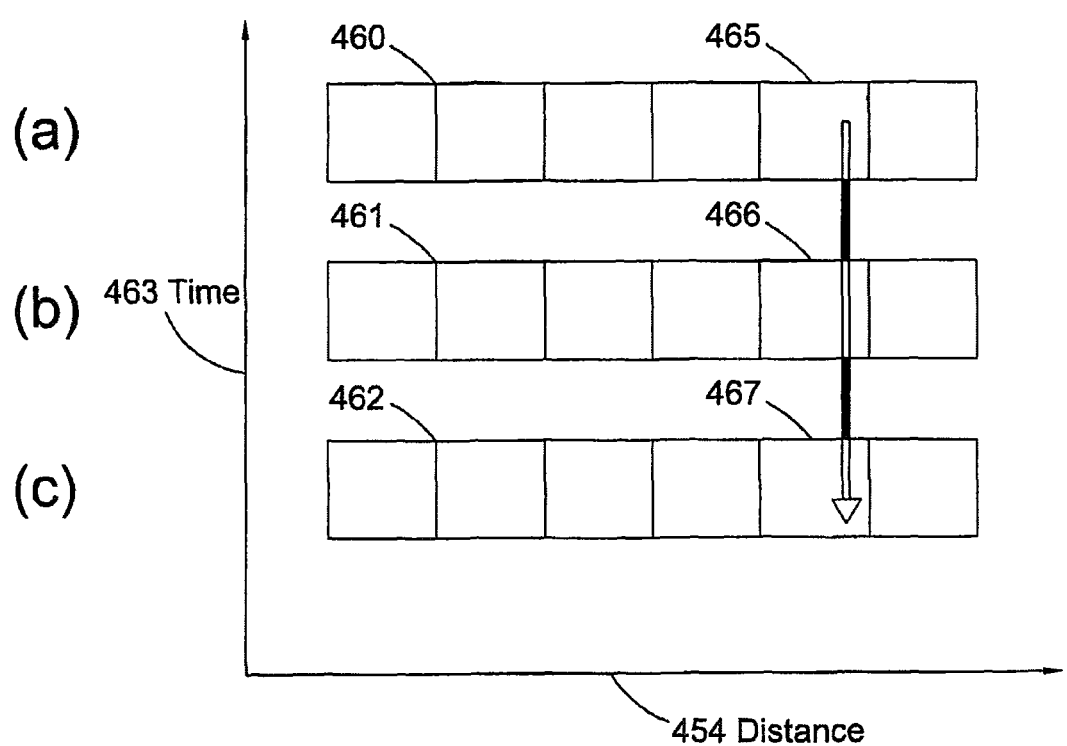
FIG. 24 is a diagrammatic representation of a manner of viewing date from a number of surveys.
Figure 26A:
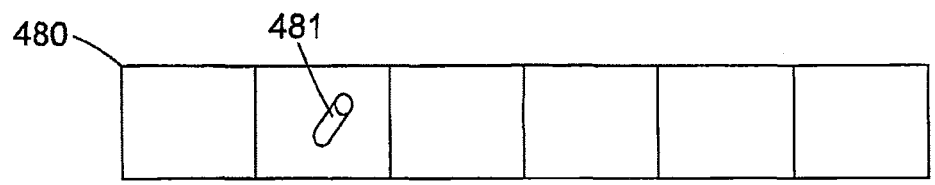
FIG. 26 is a flowchart of an exemplary method of the overall system in which the present invention operates.
Figure 26B:
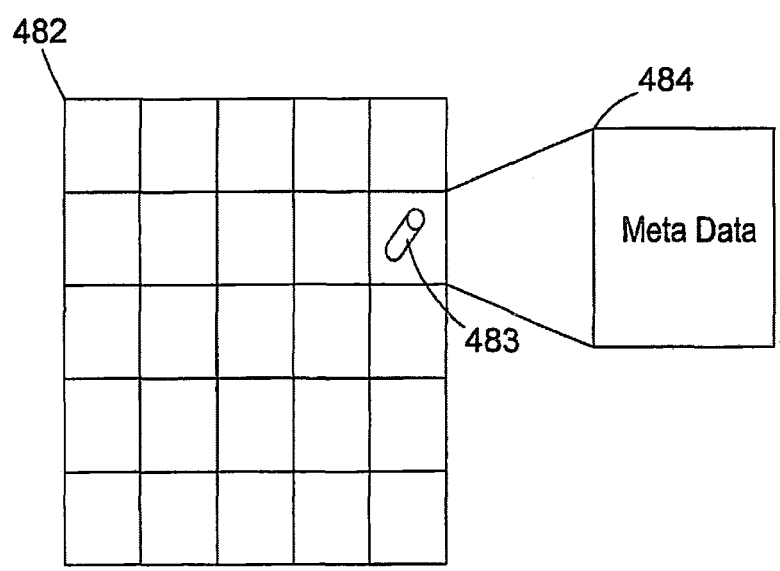

Referring now to FIG. 24, there is shown a diagram indicating the tracking of a particular field of view 465, 466, 467 across a plurality of surveys. For a particular object or feature in one survey, the system can find that object or feature in other surveys of the same scene. The system can then display the relevant augmented output images for the location from all surveys conducted as a time lapse animation. There is shown a series of three surveys 460, 461, 462 with a particular location 465, 466, 467 shown from each survey. In this way, the changes in the survey results over time can be monitored, for example the growth rate of biofouling on a structure.

Referring now to FIGS. 25(a) and (b), there is shown, a vertical cylindrical riser 470 with a helical survey path. A riser is large mechanical structure that connects different parts of an oil rig to the sea bed or drilling head and is often used to transport oil and gas. The risers may be mobile, in that while their ends are fixed in position, the body of the riser may move in response to tidal currents and the like. In effect the structure can vary in position in 3D space. Riser inspection is an important aspect of the maintenance operations of a production platform.

An underwater survey vehicle is tasked with inspecting a riser. It is launched from a known position, which its internal telemetry records. The vehicle then proceeds in a helical fashion to descend along the riser. The sequential imaging system records images of the riser as it descends. The helical path ensures that a complete record of the riser is obtained. Each image obtained is tagged with a corresponding position obtained with reference to the launch position and by recording telemetry from inertial, hydrostatic, anemometric or baseline sensors. For an ROV survey, as the survey proceeds, the image processing module can compare the survey data to previous survey data to determine what changes, if any, have occurred, rate any that have according to seriousness and make a determination whether the survey can proceed or immediately raise an alarm. For an AUV survey, the detection of changes may trigger a more detailed analysis of the area in question.

The underwater survey vehicle travels the helical path shown to produce a survey, whose results are collated in linear composite image 477. This composite image 477 is the complete record of the helical survey. However, the shorter composite images 477, 748 are selection composite images where the images contributing thereto are a selection of a larger set of images. The first selection composite image 47B represents only those frames of composite image 477 that would correspond with what an observer would see from positions 472, 474 and 476 along the south facing side of the cylinder. Similarly, the second selection composite image 749 represents only those frames of composite image 477 that would correspond with what an observer would see from positions 471, 473 and 475 along the east facing side of the cylinder. A user may prefer to look at the shorter composite images 478, 749 as they represent a view to which they may be more accustomed.

Mosaicking

As discussed above, it can be difficult to stitch together a plurality of overlapping augmented output images to form an accurate composite image. One way to overcome this problem is to track certain reference objects in augmented output images. The reference objects may be features of the seabed, such as sand ripple, or a rock, or small features on a pipe. In the frame interval for each augmented output image, a mosaicking analysis is carried out searching for suitable reference features. This may comprise analysis of the standard images captured, or capturing additional images under a variety of lighting and camera parameters. Preferably, any such additional images would be captured at a high frame rate so as not to interfere with the surveying sequential imaging operation. The variety of lighting and camera conditions available allow for a greater number of potential reference features, including features that would not be visible to the naked eye.

If reference features are identified in an image that was captured to search for reference images, and no suitable reference image is identified, the image may be discarded to save on storage. If one or more reference features are identified in such an image, it is not necessary to keep the full image. Preferably, the reference feature is extracted from the image, and its location within the frame with the remaining data is discarded. The extracted reference feature may be tagged with the location of its capture. Additionally, the optimised lighting and camera parameters used to identify the reference image are recorded so that they may be used to capture that reference feature in the subsequent images. Furthermore, these optimal parameters can be used to increase the probability of highlighting other reference features in the images as the survey progresses.

Once a reference feature has been identified, subsequent images are searched for that reference features. The subsequent images may also be searched for new reference features. Reference features may be tracked across images by carrying out a correlation operation between the extracted image of the reference feature and the subsequent image.

Once a correlated reference object has been found in overlapping augmented output images, it is possible to stitch those augmented output images together so as to maintain accuracy therein.

In certain embodiments, specific articles are deliberately laid near a survey object to act as reference features as so provide for accurate mosaicking. Preferably, the specific reference features are laid randomly in the area in question. In this situation, a preferred set of lighting and camera parameters are provided for imaging the specific articles. The use of deliberately laid reference features in this way is particularly useful in relation to measurement for spool piece metrology i.e. a seabed survey to determine the precise distance between pipes so that a connector can be laid. Such a system will also acquire inertial navigation data and combined with the image acquisition and control system, this enhances the data accuracy.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of processing survey data of an underwater scene comprising:
   generating an augmented image of each of a plurality of fields of view within the scene, wherein each augmented image comprises at least:
      a plurality of images of the scene obtained sequentially, the images obtained using different light classes, and wherein camera and lighting parameters are synchronized so that each time an image is acquired, a specific configuration and potentially differing configuration of lighting parameters and camera parameters are used;
      a location tag associated with that scene image, and
      machine vision processed metadata associated with the scene images and the scene;
   concatenating the augmented images into a composite image based on the location tags associated therewith, including modifying the scene images to improve concatenation; and
   linking each scene image and metadata in the composite image to its augmented image and to corresponding scene images and metadata in the other augmented images.

2. A method as claimed in claim 1 wherein the step of concatenating the scene images into a composite image comprises forming a single image file.

3. A method as claimed in claim 1, wherein the location tag associated with an augmented image comprises absolute location information.

4. A method as claimed in claim 1, wherein the location tag associated with one or more of the augmented images comprises location information relative to the absolute location information of another of the augmented images.

5. A method as claimed in claim 1, wherein the augmented image is a high resolution augmented image.

6. A method as claimed in claim 1 comprising the step of forming a selection composite image comprising concatenating a subset of the scene images of the composite image, each scene image linking to its augmented image.

7. A method as claimed in claim 6 in which comprising further modifying at least one of the subset of scene images.

8. A method as claimed in claim 1, wherein the step of modifying the scene images includes changing the resolution of the scene image.

9. A method as claimed in claim 1, wherein the step of modifying the scene images includes adjusting the scale of the scene image.

10. A method as claimed in claim 1, wherein the step of modifying the scene images includes adjusting the pincushion or barrel distortion of the scene image.

11. A method as claimed in claim 1, wherein the scene image is a white light image.

12. A method as claimed in claim 1, wherein the scene image is a sonar image.

13. A method as claimed in claim 1, wherein the machine vision processed metadata comprises structured light or laser data.

14. A method as claimed in claim 1, wherein the machine vision processed metadata comprises fluorescence data from an ultraviolet light source.

15. A method as claimed in claim 1, wherein the machine vision processed metadata comprises edge or object data.

* * * * *